(12) United States Patent
Toyama et al.

(10) Patent No.: US 8,159,635 B2
(45) Date of Patent: Apr. 17, 2012

(54) LIQUID CRYSTAL DISPLAY DEVICE

(75) Inventors: Hirofumi Toyama, Minami-Ashigara (JP); Yoji Ito, Minami-Ashigara (JP); Junichi Hirakata, Minami-Ashigara (JP); Shinji Ueda, Minami-Ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 117 days.

(21) Appl. No.: 12/822,783

(22) Filed: Jun. 24, 2010

(65) Prior Publication Data

US 2010/0328584 A1    Dec. 30, 2010

(30) Foreign Application Priority Data

Jun. 26, 2009   (JP) .................. P2009-152900

(51) Int. Cl.
*G02F 1/1335*        (2006.01)
(52) U.S. Cl. ........................................................ 349/96
(58) Field of Classification Search .................... 349/96
See application file for complete search history.

(56) References Cited

U.S. PATENT DOCUMENTS

2002/0098352 A1    7/2002  Kishioka

FOREIGN PATENT DOCUMENTS

| JP | 9-080424 A | 3/1997 |
|---|---|---|
| JP | 2002-173656 A | 6/2002 |
| JP | 2007-279083 A | 10/2007 |

*Primary Examiner* — Phu Vu
(74) *Attorney, Agent, or Firm* — Buchanan Ingersoll & Rooney PC

(57) ABSTRACT

A liquid crystal display device is provided and includes: a liquid crystal cell including a pair of transparent glass substrates each having a transparent electrode, and a nematic liquid crystal between the pair of the transparent glass substrates; and a pair of polarizing plates sandwiching the liquid crystal cell. At least one of the pair of polarizing plates includes a protective film; a polarizer; and an optical compensation film. One of the pair of transparent glass substrates, an adhesive; the optical compensation film; the polarizer; and the protective film are stacked in this order, and they satisfy the following equations (1) to (3):

$$|n1-n2| \leq 0.03 \quad (1)$$

$$|n2-n3| \leq 0.03 \quad (2)$$

$$|n1-n3| \leq 0.03 \quad (3)$$

where n1, n2, and n3 indicate average refractive indices at 589 nm of the one of the pair of the transparent glass electrodes, the adhesive; and the optical compensation film, respectively.

11 Claims, No Drawings

LIQUID CRYSTAL DISPLAY DEVICE

This application is based on and claims priority under 35 U.S.C. §119 from Japanese Patent Application No. 2009-152900, filed Jun. 26, 2009, respectively, the entire disclosure of which is herein incorporated by reference.

BACKGROUND OF THE INVENTION

1. Field of the Invention

The present invention relates to a liquid crystal display device. In particular, the invention relates to a liquid crystal display device mounting a polarizing plate using an optical compensation film contributive to improvement of a front contrast ratio of the liquid crystal display, a polarizer and a polarizing plate protective film.

2. Description of Related Art

A liquid crystal display device is a space-saving image display device having low power consumption and the uses thereof are expanded every year. In the background art, the high dependence of an image on a viewing angle is a serious weakness of the liquid crystal display device. However, a high viewing angle liquid crystal mode by a VA (Vertical Alignment) mode has been recently commercialized. As a result, the demands for the liquid crystal display device are rapidly spreading even in markets in which an image of high definition is required such as TV.

The VA mode liquid crystal display device has a merit that it has generally high contrast ratio, compared to the other liquid crystal display modes. However, further improvements are required.

In order to obtain the high contrast ratio, it is examined to lower brightness at the time of the black display. When it is desired to lower the brightness at the time of black display, it has only to use a film having low haze properties. However, when a surface haze is lowered too much, the film is closely adhered or scratch is easily formed on a surface thereof.

In addition, it is known that it is necessary to lower an internal haze of a phase difference film for improvement of the front contrast ratio (JP-A-9-80424). However, since the front contrast ratio of a panel is low such as 1000 or less in the background art, it is not necessary to control even a refractive index of a member constituting the liquid crystal display device. However, the front contrast ratio (CR) of the panel is recently improved in the VA mode liquid crystal display (CR=5000 to 10000) and it is thus necessary to control a refractive index of a polarizing plate.

As a means for improving a tone depending on the optic angle or a viewing angle of the black display, it is investigated even in an IPS or FFS mode to arrange an optical compensation material having a birefringence characteristic between a liquid crystal layer and a polarizing plate. For example, it is disclosed that a birefringence medium, in which optic axes having a function of compensating an increase or decrease in retardation of the liquid crystal layer at the time of slanting are made to be orthogonal to each other, is arranged between a substrate and the polarizing plate, thereby improving coloring when directly viewing the white display or halftone display from an oblique direction (refer to JP-A-9-80424). However, the front contrast ratio is not sufficiently improved by the method.

In addition, when an optical film such as antireflection film or conductive film (ITO film) is stacked to a display panel such as liquid crystal display device, adhesive composition including acrylic-based polymer is used. However, in the background art, since a refractive index of the adhesive composition after drying and/or curing of the composition is lower than those of the optical films, a difference of the refractive indices is caused to disturb the effective using of light. Regarding this, JP-A-2002-173656 discloses of using a specific ring-containing copolymerizable monomer component having a high refractive index after drying and/or curing of composition as a monomer unit of pressure sensitive adhesive composition so as to obtain a pressure sensitive adhesive having a refractive index close to that of an optical film or optical member.

Thus, an optical film is disclosed which has a purpose of reducing total reflection at each interface of optical film/pressure sensitive adhesive layer/optical member to effectively use the light.

Furthermore, JP-A-2007-279083 discloses a plastic film in which inner and surface hazes are adjusted to specific ranges so as to improve productivity such as handling and preservation properties of the film in a roll state and front contrast ratio of a liquid crystal display device, particularly IPS-type liquid crystal display device and in-plane retardation and thickness-direction retardation are adjusted to specific ranges so as to improve a viewing angel characteristic of the liquid crystal display device.

However, JP-A-9-80424 does not disclose that the front contrast ratio is remarkably improved by adapting the refractive indices of the adhesive layer and optical films to the refractive index of the glass. Regarding JP-A-2002-173656, it is required to further improve the front contrast ratio.

SUMMARY OF THE INVENTION

An object of the invention is to provide a liquid crystal display device using an optical compensation film having excellent productivity such as handling and preservation properties of the film in a roll state and excellent optical characteristics. In addition, another object of the invention is to provide a liquid crystal display device to which an optical compensation film and polarizing plate, contributive to improvement of a viewing angle characteristic, in particular a front contrast ratio of a VA-type liquid crystal display without deteriorating contrast ratio, are applied.

The inventors performed an examination so as to achieve the above objects. As a result, it was found that transmissivity loss by multiple reflection could be reduced and brightness at the time of white display could be increased by eliminating a difference between refractive indices of constitution members of a polarizing plate and a refractive index of a transparent glass substrate of a liquid crystal display. In addition, it was found that even when the optical compensation film had the surface haze, scattering was not caused at the interface between the film and the adhesive and the brightness at the time of black display could be thus reduced. As a result, the inventors realized that the front contrast ratio could be improved, and completed the invention through further examination based on the realization.

In other words, the means for solving the above problems can be summarized as follows.

1. A liquid crystal display device comprising:
a liquid crystal cell including: a pair of transparent glass substrates each having a transparent electrode, wherein the pair of transparent glass substrates are disposed at an interval and the transparent electrode of one of the pair of the transparent glass substrates faces to the transparent electrode of the other of the pair of the transparent glass substrates; and a nematic liquid crystal between the pair of the transparent glass substrates, wherein the nematic liquid crystal has a negative dielectric anisotropy and a longitudinal axis of a liquid crystal molecule of the nematic liquid crystal is oriented in a direction approximately perpendicular to the transparent glass substrates with no voltage applied; and a pair of polarizing plates sandwiching the liquid crystal cell;
wherein
at least one of the pair of polarizing plates includes a protective film; a polarizer; and an optical compensation film,
one of the pair of transparent glass substrates, an adhesive; the optical compensation film; the polarizer; and the protective film are stacked in this order, and
the one of the pair of the transparent glass electrodes, the adhesive; and the optical compensation film satisfy the following equations (1) to (3):

$$|n1-n2| \leq 0.03 \quad (1)$$

$$|n2-n3| \leq 0.03 \quad (2)$$

$$|n1-n3| \leq 0.03 \quad (3)$$

wherein n1, n2, and n3 indicate average refractive indices at 589 nm of the one of the pair of the transparent glass electrodes, the adhesive; and the optical compensation film, respectively.

2. The liquid crystal display device according to item 1, wherein the one of the pair of the transparent glass substrates, the polarizer, and the protective film satisfy the following equations (4) to (6):

$$|n1-n4| \leq 0.03 \quad (4)$$

$$|n4-n5| \leq 0.03 \quad (5)$$

$$|n1-n5| \leq 0.03 \quad (6)$$

wherein n4 and n5 indicate average refractive indices at 589 nm of the polarizer and the protective film, respectively.

3. The liquid crystal display device according to item 1 or 2, wherein the optical compensation film satisfies the following equations (7) and (8):

$$30 \text{ nm} \leq Re(590) \leq 80 \text{ nm} \quad (7)$$

$$80 \text{ nm} \leq Rth(590) \leq 300 \text{ nm} \quad (8)$$

wherein Re(590) and Rth(590) indicate an in-plane retardation and a thickness-direction retardation of the optical compensation film, respectively, which are measured at a wavelength of 590 nm.

4. The liquid crystal display device according to any one of items 1 to 3, wherein an internal haze of the optical compensation film is 0.10% or less and a surface haze of the optical compensation film is 1.0% or less.

5. The liquid crystal display device according to any one of items 1 to 4, wherein an internal haze of the optical compensation film is 0.10% or less and a surface haze of the optical compensation film is 0.01% to 1.0%.

6. The liquid crystal display device according to any one of items 1 to 5, wherein the optical compensation film is subjected to a surface treatment and a surface haze of the optical compensation film after the surface treatment is 0.05% to 1.0%.

7. The liquid crystal display device according to any one of items 1 to 6, wherein the optical compensation film is a cyclic olefin film.

8. The liquid crystal display device according to any one of items 1 to 7, wherein the optical compensation film includes an additive having a negative intrinsic birefringence.

9. The liquid crystal display device according to item 8, wherein the additive is polymethyl methacrylate polymer.

10. The liquid crystal display device according to any one of items 1 to 9, wherein an average refractive index n2 of the adhesive is 1.470 to 1.580.

11. The liquid crystal display device according to any one of items 1 to 10, wherein the adhesive is a copolymer including a repeating unit derived from an aromatic ring-containing monomer.

DETAILED DESCRIPTION OF EXEMPLARY EMBODIMENTS

According to an exemplary embodiment of the invention, it was found that when the average refractive indices of the transparent glass substrates, the adhesive and the optical compensation film are adjusted, the front contrast ratio of the liquid crystal display device using the transparent glass substrates, the adhesive and the optical compensation film was improved.

In addition, it was found that when the inner and surface hazes of the optical compensation film were made to be within specific ranges, it was possible to obtain the good manufacturing stability thereof and to effectively suppress lowering of the contrast ratio of the liquid crystal display device having the optical compensation film mounted thereto.

Further, by using the polarizing plate including the surface-treated optical compensation film, it is possible to provide a liquid crystal display device capable of improving roll scratch resistance of the optical compensation film and front contrast ratio of the liquid crystal display device at the same time.

Furthermore, by adding an additive having a negative intrinsic birefringence to the optical compensation film, it is possible to provide a liquid crystal display device capable of achieving a color change (color shift) when seen askew at the time of black display and improving the front contrast ratio at the same time.

Hereinafter, exemplary embodiments of the invention will be more specifically described. In addition, in the specification, when a value indicates a physical property value, a characteristic value and the like, the description of "(value 1) to (value 2)" means "(value 1) or more and (value 2) or less" and the value 1 is included as the lowest limit and the value 2 is included as the highest limit within the range. Additionally, in the specification, "(metha)acrylate" means at least one of "acrylate and methacrylate." "(metha)acrylic acid" and the like is also the same.

In the specification, "polarizing plate" includes a long polarizing plate and a polarizing plate that is cut into a size to be incorporated into a liquid crystal device (in the specification, "cut" includes "punching" and "cutout"), unless particularly mentioned otherwise. Additionally, in the specification, "polarizer" and "polarizing plate" are discriminately used. The "polarizing plate" means a layered product having a transparent protective film for protecting a polarizer on at least one surface of the "polarizer."

In the specification, Re(λ) and Rth(λ) indicate in-plane retardation and thickness-direction retardation at a wavelength λ, respectively. Re(λ) is measured by KOBRA 21ADH or WR (Oji Scientific Instruments) for an incident light of a wavelength λ nm in a normal direction to a film.

When a film to be measured is indicated with a uniaxial or biaxial refractive index ellipsoid, Rth(λ) is calculated by a following method.

Rth(λ) is calculated by KOBRA 21ADH or WR based on retardation values, which are six-points measured for Re(λ) for incident lights of a wavelength λ nm in each of tilted directions at a step of 10° from the normal direction to one side 50° with respect to the normal direction of the film while the slow axis (determined by KOBRA 21ADH or WR) is considered as a tilted axis (a rotation axis) (when there is no slow axis, any direction in the film surface is considered as a rotation axis), a hypothetical value of an average refractive index and an inputted film thickness value.

In the above, for a film having a direction in which a retardation value is zero at a certain tilt angle with the in-plane slow axis from the normal direction being a rotation axis, a retardation value at a tilt angle larger than the certain tilt angle is changed into a sign of a negative value and then calculated by KOBRA 21ADH or WR.

Alternatively, with the slow axis as a tilted axis (rotation axis) (when there is no slow axis, any direction in a film surface is a rotation axis), retardation values may be measured from two tilted directions and Rth may be calculated from equations (1) and (2) based on the retardation values, a hypothetical value of an average refractive index and an inputted film thickness value.

$$Re(\theta) = \left[ nx - \frac{ny \times nz}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}}\right] \times \frac{d}{\cos\left\{\sin^{-1}\left(\frac{\sin(-\theta)}{nx}\right)\right\}}$$

Equation (1)

Note: $Re(\theta)$ indicates a retardation value at a direction angle $\theta$-tilted from a normal direction. In equation (1), nx indicates a refractive index in an in-plane slow axis direction, ny indicates a refractive index in a direction orthogonal to nx in the plane and nz indicates a refractive index in a direction orthogonal to nx and ny. d indicates a film thickness.

$$Rth = ((nx+ny)/2 - nz) \times d \quad \text{(Equation (2))}$$

When a film to be measured cannot be expressed with a uniaxial or biaxial refractive index ellipsoid, i.e., is a so-called film having no optic axis, $Rth(\lambda)$ is calculated by a following method.

$Rth(\lambda)$ is calculated by KOBRA 21ADH or WR based on retardation values, which are eleven-points measured for $Re(\lambda)$ for incident lights of a wavelength $\lambda$ nm in each of tilted directions at a step of 10° from −50° to +50° with respect to the normal direction of the film while the slow axis (determined by KOBRA 21ADH or WR) is considered as a tilted axis (a rotation axis), a hypothetical value of an average refractive index and an inputted film thickness value.

In the above measurement, values of "Polymer Handbook" (JOHN WILLEY&SONS, INC) and catalogue values of various films can be used as the hypothetical value of an average refractive index. When a value of an average refractive index is not known in advance, it can be measured with an Abbe refractometer. The average refractive indices of major optical films are exemplified as follows: cellulose acylate (1.48), cyclo olefin-based polymer (1.52), polycarbonate (1.59), polymethyl methacrylate (1.49) and polystyrene (1.59).

By inputting the hypothetical values of the average refractive indices and the film thickness, KOBRA 21ADH or WR calculates nx, ny and nz.

In addition, in the specification, the measuring wavelength is 590 nm, unless particularly mentioned otherwise.

According to an exemplary embodiment of the invention, a liquid crystal display device includes:

a liquid crystal cell including: a pair of transparent glass substrates each having a transparent electrode, wherein the pair of transparent glass substrates are disposed at an interval and the transparent electrode of one of the pair of the transparent glass substrates faces to the transparent electrode of the other of the pair of the transparent glass substrates; and a nematic liquid crystal between the pair of the transparent glass substrates, wherein the nematic liquid crystal has a negative dielectric anisotropy and a longitudinal axis of a liquid crystal molecule of the nematic liquid crystal is oriented in a direction approximately perpendicular to the transparent glass substrates with no voltage applied; and a pair of polarizing plates sandwiching the liquid crystal cell;

wherein at least one of the pair of polarizing plates includes a protective film; a polarizer; and an optical compensation film, one of the pair of transparent glass electrodes, an adhesive; the optical compensation film; the polarizer; and the protective film are stacked in this order, and the one of the pair of the transparent glass electrodes, the adhesive; and the optical compensation film satisfy the following equations (1) to (3):

$$|n1-n2| \leq 0.03 \quad (1)$$

$$|n2-n3| \leq 0.03 \quad (2)$$

$$|n1-n3| \leq 0.03 \quad (3)$$

wherein n1, n2, and n3 indicate average refractive indices at 589 nm of the one of the pair of the transparent glass electrodes, the adhesive; and the optical compensation film, respectively.

The equations (1) to (3) are preferably following equations (1)' to (3)'.

$$|n1-n2| \leq 0.02 \quad (1)'$$

$$|n2-n3| \leq 0.02 \quad (2)'$$

$$|n1-n3| \leq 0.02 \quad (3)'$$

Equations (1) to (3) within the above ranges are preferable, because it is possible to suppress lowering of the front contrast ratio even when the optical compensation film has a surface haze. In addition, a refractive index of a glass substrate, which is generally used for a liquid crystal cell, is about 1.5 to 1.55. For improving the front contrast ratio, it is preferable that a difference between the refractive index of the glass substrate and refractive indices of the optical compensation film and the adhesive layer is smaller. Accordingly, an average refractive index of the optical compensation film is preferably 1.500 to 1.570, more preferably 1.505 to 1.565 and most preferably 1.510 to 1.560. An average refractive index of the adhesive layer is preferably 1.470 to 1.580, more preferably 1.480 to 1.570 and most preferably 1.490 to 1.560.

Further, in the liquid crystal display device of the invention, it is preferable that when average refractive indices of the polarizer and the polarizing plate protective film at 589 nm are indicated with n4 and n5, following equations of (4) to (6) are satisfied.

$$|n1-n4| \leq 0.03 \quad (4)$$

$$|n4-n5| \leq 0.03 \quad (5)$$

$$|n1-n5| \leq 0.03 \quad (6)$$

Equations (4) to (6) are preferably following equations (4)' to (6)'.

$$|n1-n4| \leqq 0.02 \quad (4)'$$

$$|n4-n5| \leqq 0.02 \quad (5)'$$

$$|n1-n5| \leqq 0.02 \quad (6)'$$

Equations (4) to (6) within the above ranges are preferable because scattering and/or total reflection is little generated at an interface between members constituting the polarizing plate and an interface between the members and the glass, the brightness is improved at the time of white display and light leakage is suppressed at the time of black display, thereby improving the front contrast ratio of the liquid crystal display device.

(Adhesive)

As an adhesive used in the liquid crystal display device of the invention, an adhesive is preferably used which has excellent optical transparency, exhibits adhesive characteristics of proper wetness and cohesion and adhesion and thus has excellent weatherability and durability. Acrylate-based adhesive is preferable that exhibits the above characteristics.

Preferably, the acrylate adhesive contains copolymer made of a composition containing at least one of monomers having a positive intrinsic birefringence solely, at least one of acrylate monomers having a negative intrinsic birefringence solely and at least one of monomers having a crosslinking portion. The monomer used in acrylate copolymer, which is base polymer of the acrylate-based polymer in the background art, has a negative intrinsic birefringence and the acrylate copolymer has a negative photoelasticity coefficient. Thereby, when an adhesive layer is distorted, retardation is caused and the light leakage is thus generated. By using and copolymerizing monomers having a positive intrinsic birefringence solely, instead of the acrylate-based monomer used in the background art, in the monomer used in the base polymer, it is possible to control the retardation due to the distortion of the adhesive layer and thus to prevent the light leakage. In addition, by the copolymerization, it is possible to prevent peeling of the polarizing plate, which is caused when a compound having a positive intrinsic birefringence is separately added. In the invention, the adhesive is preferably a copolymer including a repeating unit derived from an aromatic ring-containing monomer.

In addition, by controlling a ratio of the aromatic ring contained in the adhesive layer, it is possible to control the refractive index of the adhesive layer. In other words, when the ratio of the aromatic ring is increased, the refractive index of the adhesive layer is increased. When the ratio of the aromatic ring in the adhesive layer is adjusted to 10% to 100 mass % (weight %), it is possible to adjust the refractive index of the adhesive layer within a range of about 1.47 to 1.58 and to make the refractive index difference with the optical compensation film small. The ratio of the aromatic ring in the adhesive can be changed in accordance with the average refractive index of the optical compensation film to be used.

By adjusting types, ratio and amounts of the monomer having a positive intrinsic birefringence solely and the acrylate monomer having a negative intrinsic birefringence solely, it is possible to adjust the photoelasticity coefficient of the adhesive layer to a desired one. For example, by increasing the monomer component (repeating unit) constituting the copolymer and having a positive intrinsic birefringence or decreasing the acrylate-based monomer component constituting the copolymer and having a negative intrinsic birefringence, it is possible to increase the photoelasticity coefficient.

In addition, by decreasing the monomer component constituting the copolymer and having a positive intrinsic birefringence or increasing the acrylate-based monomer component constituting the copolymer and having a negative intrinsic birefringence, it is possible to decrease the photo elasticity coefficient.

In addition, the intrinsic birefringence is an intrinsic birefringence depending on a molecular structure and is generated by polarizability anisotropy in a molecule. Further, a magnitude of the macro birefringence is governed by an intrinsic birefringence and an orientation of molecules. When the orientation is totally random, a macroscopic birefringence is zero even when the intrinsic birefringence of a single molecule is large. The positive intrinsic birefringence means that a slow axis is generated in a direction same as a drawing direction of a molecule (rubbing direction for liquid crystal and the like) and the negative intrinsic birefringence means that the slow axis is generated in a vertical direction. The measuring method for the sign (positive or negative) of the intrinsic birefringence is as follows: a slow axis is determined with a color change at the time when a single sample of each composition is examined through a sensitive tint plate by using a polarizing microscope under environments of temperature of 25° C. and humidity of 60% RH. Then, for polymer, a birefringence can be determined from a direction of the slow axis at the time when applying extension or shear stress, and for liquid crystals of a low molecular weight, and from a direction of the slow axis when a polyvinyl alcohol surface is rubbed with acryl wool that is then disposed thereon. In addition, in the invention, even when each intrinsic birefringence of the monomer having a positive intrinsic birefringence solely and the acrylate-based monomer having a negative intrinsic birefringence solely is not exactly specified, the adhesive layer can be adjusted to a desired photoelasticity coefficient by the above method.

In addition, the photoelasticity coefficient is defined as birefringence ($\Delta n$) that is generated when applying stress ($\sigma$) and can be expressed as follows.

$$\text{In-plane photoelasticity coefficient}(C) = \Delta n/\sigma \quad (1-1)$$

$$\text{Photo elasticity coefficient in a thickness direction} \\ (Cth) = \Delta nth/\sigma \quad (1-2)$$

Further, in the specification, the photoelasticity of an in-plane direction is measured as follows, unless mentioned otherwise. Under environments of 25° C. and 60%, the measurement is performed by applying tension of 0 to 10N to a sample of 2 cm² with ellipsometer M-220 (JASCO Corporation) (measurement wavelength is 630 nm). When a load area of the sample is changed due to distortion, the area is corrected to calculate accurate stress.

The photoelasticity coefficient in a thickness direction (Cth) is calculated by following equations (2) and (3), based on retardations R($\theta$) at the time when tilting the adhesive applied with the tension to 0° and 40°, assuming that the adhesive can be expressed with a uniaxial or biaxial refractive index ellipsoid. The retardation values are measured from two tilted directions while the slow axis is considered as a tilted axis (a rotation axis) (when there is no slow axis, any direction in the film surface is considered as a rotation axis). Based on the corresponding values, a hypothetical value of an average refractive index and an inputted film thickness value, Cth is calculated from equations (1-2), (2) and (3).

$$Re(\theta) = \left[ nx - \frac{ny \times nz}{\sqrt{\left\{ ny\sin\left(\sin^{-1}\left(\frac{\sin(-\theta)}{nx}\right)\right)\right\}^2 + \left\{ nz\cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}}$$

Equation (2)

Note: Re(θ) indicates a retardation value at a direction angle θ-tilted from a normal direction. In equation (2), nx indicates a refractive index in an in-plane slow axis direction, ny indicates a refractive index in a direction orthogonal to nx in a plane and nz indicates a refractive index n a direction orthogonal to nx and ny. d indicates a film thickness.

$$\Delta nth = ((nx+ny)/2 - nz)$$ (Equation 3)

When peripheral unevenness occurs, a shear strain is caused in the adhesive and the refractive index ellipsoid in the adhesive is tilted to an oblique direction. Accordingly, for the shear strain, Cth as well as C is also an important parameter.

As the adhesive, an adhesive is preferably used which exhibits adhesive characteristics of proper wetness and cohesion and adhesion and thus has excellent weatherability and durability. Acrylate-based adhesive is known that exhibits the above characteristics. The adhesive of the invention is preferable the acrylate-based adhesive and preferably contains the copolymer (hereinafter, referred to as "acrylate-based high-molecule) formed of a composition containing acrylate-based monomers. In other words, the acrylate-based high-molecule has, as base polymer, acrylate-based polymer having a monomer unit of (metha)acrylic acid alkyl ester as a main skeleton. In addition, (metha)acrylic acid alkyl ester refers to acrylic acid alkyl ester and/or methacrylic acid alkyl ester and has the meaning same as (metha) of the invention. Additionally, as long as it is acrylate-based high-molecule generally used, there is no particular limit (metha)acrylic acid alkyl ester constituting the main skeleton of the acrylate-based polymer may be (metha)acrylic acid methyl, (metha)acrylic acid ethyl, (metha)acrylic acid propyl, (metha)acrylic acid butyl and the like, for example. These are generally used in the acrylate adhesive. These monomers have typically a negative intrinsic birefringence at 25° C. and 60% and can be appropriately adapted as acrylate-based monomers having a negative intrinsic birefringence solely.

In addition, the copolymer of the invention is formed of composition including monomers having a positive intrinsic birefringence solely, in addition to the monomers having a negative intrinsic birefringence used in the acrylate-based adhesive. The monomers having a positive intrinsic birefringence solely are not particularly limited. However, likewise the monomers having a negative intrinsic birefringence, the acrylate-based monomers are preferable. As the corresponding acrylate-based monomers, a compound having a side chain including fluorine atoms at alcohol component portions of ester may be preferably exemplified. For example, methacrylic acid fluorohexyl may be exemplified. In addition, preferably, the monomer has easily movable electrons of a conjugated system and the like at a main chain. In addition, the monomer preferably has a liquid crystal property. Furthermore, the monomer has preferably at least one aromatic ring. In case of having a corresponding substituent, a compound is preferably used in which the aromatic ring is bonded to the main chain through rotation-permitted bonding around a bonding axis such as sp3 bonding, not directly. Although the aromatic ring is not particularly limited, the aromatic hydrocarbon is preferable and benzene, naphthalene and the like may be exemplified. Furthermore, for the aromatic type, it is preferable that the aromaticity is higher. There is topological resonance energy (TRE) as a standard of the aromaticity. The higher the energy, the higher the aromaticity. The calculation method of TRE is described in J. Aihara, J. Am. Chem. Soc., 2048, 99(7)(1999). From this standpoint, it is preferable that the monomer having a positive intrinsic birefringence according to the invention has a benzene ring, naphthalene ring or biphenyl structure. The TRE values of benzene, naphthalene and biphenyl are 0.273, 0.389 and 0.502, respectively and the aromaticity is higher in such order. Here, in case of having a plurality of aromatic rings such as benzene rings, it is preferable that the aromatic rings are directly connected or condensed. From this standpoint, it is preferable that the monomer has a naphthalene ring or biphenyl structure. From the standpoint of cost, it is preferable that the monomer has a benzene ring.

For example, benzyl acrylate, phenoxy ethyl acrylate, acrylic acid(2-naphthyl)methyl, N-substituted maleimide (cyclohexyl maleimide and the like) and following compounds may be exemplified.

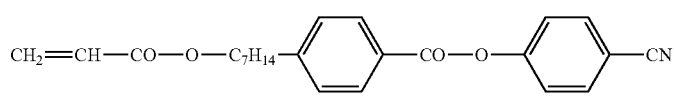
(N1)

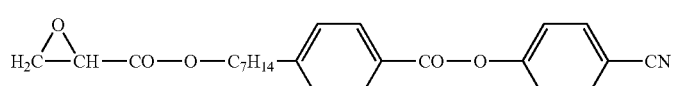
(N2)

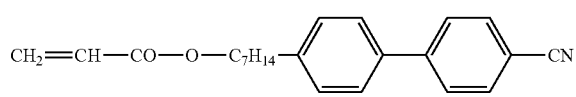
(N3)

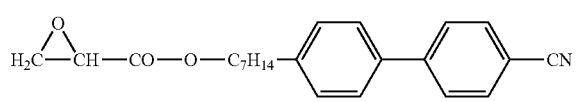
(N4)

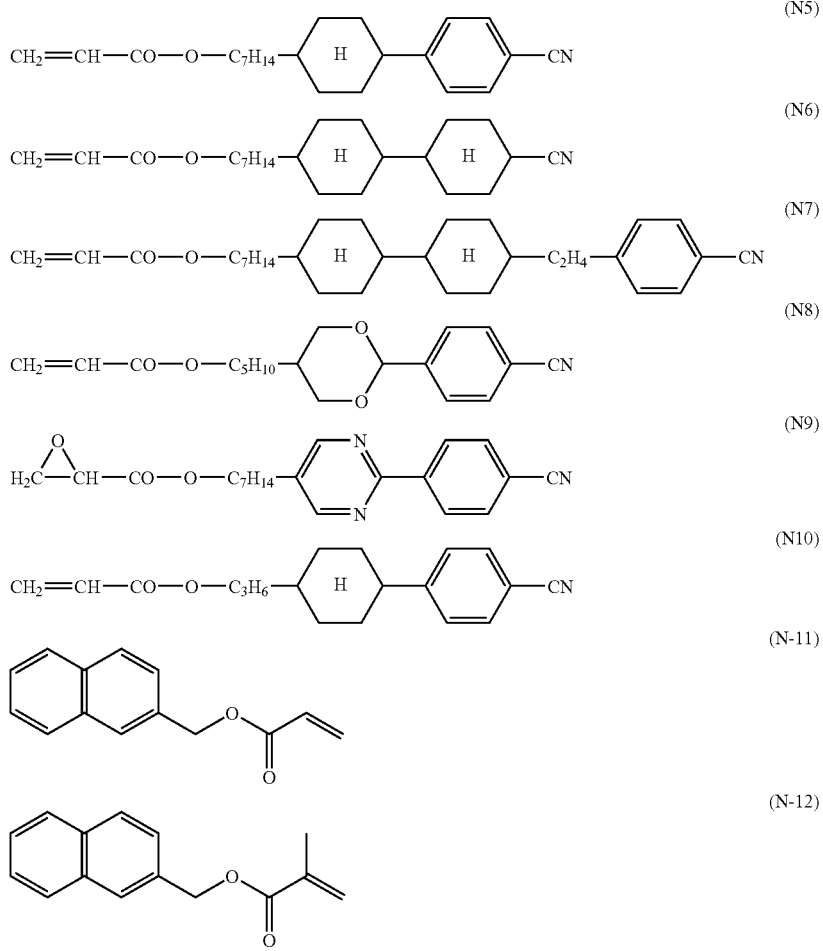

In addition, when synthesizing the copolymer, it is preferable that compatibility of the monomer having a positive intrinsic birefringence and the monomer having a negative intrinsic birefringence is good for the synthesis. As a criterion of the compatibility, octanol-water distribution coefficients (values of log P) may be used and a difference of values of log P is preferably small.

The measurement of octanol-water distribution coefficients (values of log P) can be performed by the flask leaching method described in JIS Z-7260-107 (2000). In addition, the octanol-water distribution coefficients may be estimated by the computational chemical method or empirical method, rather than the actual measurement method.

As the computational chemical method, Crippen's fragmentation method ("J. Chem. Inf. Comput. Sci.", volume 27, p 21 (1987)), Viswanadhan's fragmentation method ("J. Chem. Inf. Comput. Sci.", volume 29, p 163 (1989)), Broto's fragmentation method ("Eur. J. Med. Chem.-Chim. Theor.", volume 19, p 71 (1984)) and the like are preferably used. The Crippen's fragmentation method ("J. Chem. Inf. Comput. Sci.", volume 27, p 21 (1987)) is more preferable.

When values of log P of a certain compound are different depending on the measurement method or computational method, it is preferable to use the Crippen's fragmentation method so as to determine whether the compound is within the above range.

Furthermore, the copolymer used as an adhesive of the invention is preferably formed of composition containing a monomer having a crosslinking portion in addition to the monomers having the intrinsic birefringence. The crosslinking portion is a reaction point with a crosslinking agent. Although the monomer having a crosslinking portion is not particularly limited, it is preferable to use a monomer that is used for the base polymer of the acrylate-based adhesive in the background art. From the standpoints of the adhesion to the liquid crystal cell and the durability with respect to the uses for an optical film, α, β-unsaturated carboxylic acid containing monomer may be preferable. For example, the acrylic acid is preferably used. The α, β-unsaturated carboxylic acid containing monomer provides adhesion strength or adhesive force. Furthermore, hydroxyl group containing monomer is also preferably used as the monomer having a crosslinking portion. The hydroxyl group containing monomer provides the adhesion force by chemical bonding so as to prevent the adhesive force of the adhesive from being destroyed at high temperatures, solely or through reaction with the crosslinking agent. For example, 2-hydroxy ethyl (metha)acrylate, 2-hydroxy propyl (metha)acrylate, 2-hydroxy ethylene glycol (metha)acrylate, 2-hydroxy propylene glycol (metha)acrylate and a mixture thereof may be exemplified.

In addition, a ratio of the monomers having a positive intrinsic birefringence solely and the monomers having a negative intrinsic birefringence solely in the composition for forming the copolymer is appropriately selected by types of the monomers to be used and the desired photoelasticity. A total amount of the monomers having a positive intrinsic birefringence solely is preferably 0.5 to 30 mass % with respect to a total amount of the monomers having a negative intrinsic birefringence solely, more preferably 1 to 20 mass %, and most preferably 1 to 10 mass %. In addition, although the content of the monomers having a crosslinking portion is not particularly limited, it is preferably 0.01 to 5 mass % with respect to a total amount of the monomers, more preferably 1 to 5 mass % and most preferably 2 to 5 mass %. When the content is less than 0.01 mass %, the effect of improving the adhesive force may be decreased.

Although the average molecular weight of the acrylate-based high molecules is not particularly limited, it is preferably about 300,000 to 2,500,000. The acrylate-based polymer may be manufactured by various known methods. For example, the radical polymerization method such as bulk polymerization method, solution polymerization, suspension polymerization and the like may be appropriately selected. As the radical polymerization initiator, various known initiators such as azo-based and peroxide-based initiators may be used. The reaction temperature is typically about 50 to 80° C. and the reaction time is 1 to 8 hours. In addition, the solution polymerization method is preferable. As solvent of the acrylate-based polymer, ethyl acetate, toluene and the like may be used. The solution concentration is typically 20 to 80 weight %.

In addition, when adjusting the photoelasticity of the adhesive layer, at least one compound having a positive intrinsic birefringence may be further added to the acrylate-based adhesive as well as the copolymer of the invention. Additionally, at least one compound having a negative intrinsic birefringence may be further added. Further, it is preferable to add a compound having a positive intrinsic birefringence solely for the adjustment. By adding the compound having the intrinsic birefringence in addition to the copolymer, it is possible to easily adjust the desired photoelasticity coefficient of the adhesive layer. For example, a method may be exemplified which approximates the photoelasticity coefficient of the adhesive layer to a desired value by the copolymer of the invention and adds the compound having the intrinsic birefringence, thereby performing the fine adjustment. Thus, the compound having a positive intrinsic birefringence has only to be added in a small amount and the peeling of the polarizing plate can be also suppressed.

Although the compound having a positive intrinsic birefringence solely is not particularly limited, a rod-shaped liquid crystal compound and the like are effective. For the aromatics, it is preferable that the aromaticity is higher. In addition, the crosslinking agent to be described below can be also used as the compound having a positive intrinsic birefringence. Furthermore, the monomer having a positive intrinsic birefringence can be used as the compound having a positive intrinsic birefringence solely. In addition, it is not necessary for the compound having an intrinsic birefringence to be an organic molecule. In other words, an inorganic compound or an organic-inorganic composite is also possible. Hereinafter, the compound having a positive intrinsic birefringence solely will be specifically described. The below compound is a liquid crystal-like compound and LC-1 and LC-2 can be used as the monomer having a positive intrinsic birefringence of the invention.

LC1:

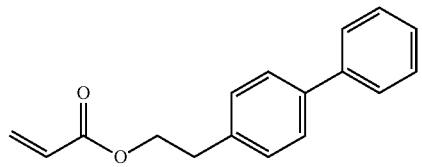

LC2:

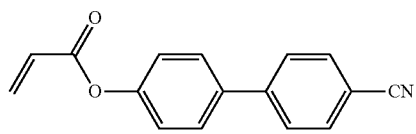

LC3:

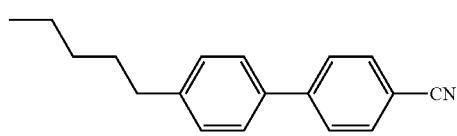

In the adhesive of the invention, the positive intrinsic birefringence component (total sum of the monomers having a positive intrinsic birefringence and the compound having a positive intrinsic birefringence) is preferably 0.5 to 30 parts by weight (parts by mass) for 100 parts by weight of the negative intrinsic birefringence monomers, more preferably 1 to 20 parts by weight, and most preferably 1 to 10 parts by weight.

In addition, it is preferable that the compound having a positive intrinsic birefringence has a higher intrinsic birefringence. Additionally, the orientation of the compound having a positive intrinsic birefringence and the copolymer of the invention is an important factor. They are oriented to be same, for example, interactions between the molecules of each component are made to be strong, so that it is possible to improve the effect of adding the compound having a positive intrinsic birefringence. Thereby, the compatibility is remarkably improved, so that the effect is achieved with the small added amount and the durability is increased. For example, when the difference in the value of log P from the copolymer is made to be within 5, the corresponding effect can be achieved.

In addition, the adhesive may arbitrarily use components that are used in the acrylate-based adhesive in the background art, in addition to the copolymer and the compound having an intrinsic birefringence. For example, addition of surfactant is effective to improve the compatibility and to suppress the peeling of the adhesive.

In addition, when forming the adhesive layer by using the adhesive, it is preferable to use the crosslinking agent. In addition, as described above, in the invention, the crosslinking agent may also serve as the compound having a positive intrinsic birefringence. As the multi functional compound that can be combined with the adhesive, organic crosslinking agent or multi functional metal chelate may be exemplified. As the organic-based crosslinking agent, epoxy-based crosslinking agent, isocyanate-based crosslinking agent, imine-based crosslinking agent, peroxide-based crosslinking agent and the like may be exemplified. One or two or more of these crosslinking agents may be combined and used. As the organic-based crosslinking agent, an isocyanate-based crosslinking agent is preferable. The isocyanate-based crosslinking agent includes tolylene diisocyanate, diphenylmethane diisocyanate, hexamethylene diisocyanate and methylol adducts thereof. In addition, the high molecule agent is also preferable. The multi functional metal chelate has such a structure that polyvalent metal is covalent bonded or coordinate covalent bonded with organic compound. As the polyvalent metal atoms, Al, Cr, Zr, Co, Cu, Fe, Ni, V, Zn, In, Ca, Mg, Mn, Y, Ce, Sr, Ba, Mo, La, Sn, Ti and the like may be exemplified. As the atoms of the organic compound covalent bonded or coordinate covalent bonded, oxygen atoms may be exemplified. As the organic compound, alkylester, alcohol compound, carboxylic acid compound, ether compound, ketone compound and the like may be exemplified.

In the adhesive, it is particularly preferable that 0.5 to 20 parts by weight of isocyanate-based crosslinking agent is contained for 100 parts by weight of the copolymer (solid portion). Furthermore, the crosslinking agent has preferably a positive intrinsic birefringence because it is possible to suppress a change of the adhesive manufacturing process to the minimum and from standpoints of the compatibility and the durability. When the crosslinking agent is used so as to adjust the photoelasticity of the adhesive layer to a desired range, the crosslinking agent contains preferably two or more aromatic rings. Furthermore, for the aromatics, it is preferable that the arimaticity is higher. For example, Japanese urethane (NIPPON POLYURETHANE INDUSTRY CO., LTD.) CORONATE L, MILLIONATE MR, MILLIONATE MT, 1,6-naphthalenediyl diisocyanate, (1,3,5-benzenetriyl) tris(4,1-phenylene) trisisocyanate and the like are preferably used.

In addition, when the crosslinking agent is added in a large amount (1% or more), the crosslinking reaction excessively progresses, so that relaxativeness of the adhesive may be decreased. In order to prevent this, the content of the monomers having the crosslinking portion ($\alpha, \beta$ unsaturated carboxylic acid monomer or hydroxyl group and the like) of the acrylate polymer is preferably 0.1 to 3 mass % for the entire monomers, more preferably 0.1 to 2 mass %, and most preferably 0.1 to 1 mass %. In addition, as the method of maintaining the relaxativeness, there is a method of adding acrylate polymer having no crosslinking portion, in which the added amount is preferably 1 to 30 mass % for the copolymer of the invention, more preferably 1 to 20 mass %, and most preferably 1 to 10 mass %, and the corresponding method can be combined with the above method.

Furthermore, a variety of additives such as tackifier, plasticizer, glass fibers, glass beads, metal powders, filler consisting of inorganic powders, pigment, colorant, filler, antioxidant, ultraviolet absorbent, silane coupling agent and the like may be properly added to the adhesive, as required, without departing from the purpose of the invention. In addition, fine grains may be added to provide the adhesive layer with a light diffusing property.

As the additives, the silane coupling agent is preferable and the added amount thereof is preferably 0.001 to 10 parts by weight for 100 parts by weight of the copolymer (solid portion), and more preferably 0.005 to 5 parts by weight. The conventionally known agent may be used as the silane coupling agent. For example, epoxy group containing silane coupling agent such as 3-glycidoxypropyl trimethoxysilane, 3-glycidoxypropyl triethoxysilane, 3-glycidoxypropyl methyldiethoxysilane and 2-(3,4 epoxycyclohexyl)ethyl trimethoxysilane, amino group containing silane coupling agent such as 3-aminopropyl trimethoxysilane, N-2-(aminoethyl)-3-aminopropyl methyldimethoxysilane and 3-triethoxycyril-N-(1,3-dimethylbutylidene)propylamine, (metha)acryl group containing coupling agent such as 3-acryloxypropyl trimethoxysilane and 3-methacryloxypropyl triethoxysilane and isocyanate group containing coupling agent such as 3-isocyanatepropyl triethoxysilane may be exemplified.

The polarizing plate of the invention is coated with the adhesive of the invention and stacked to the transparent glass substrate of the liquid crystal cell. When applying the adhesive of the invention to the polarizing plate, it is important that a component should not remain on a glass surface at the time of rework and each component should not be phase-separated. The phase separation is caused due to the compatibility of each component. The better the compatibility of each component, the phase separation is little generated, so that the effects of the invention can be effectively achieved. In addition, the method of improving the compatibility has been described above. When determining the phase separation, it is possible to confirm whether the phase separation is generated, by examining the adhesive with a microscope after treated at 80° C. and a dry condition for 1000 hours or 60° C. and 90% RH for 1000 hours.

A gel fraction of the adhesive is preferably 70% to 90%, and more preferably 80% to 90%. When the gel fraction is less than the corresponding range, a mismatch of the polarizing plate after the durability test is larger, so that the light leakage may be also greater. In the meantime, when the gel fraction exceeds the corresponding range, the proper relaxativeness and adhesion may not be obtained. By adding the acrylate-based polymer having no crosslinking portion, it is possible to lower and adjust the gel fraction. In addition, the method of measuring the gel fraction is as follows: the bulk adhesive is taken to measure the weight (w1) and left in ethyl acetate for one day. Then, polymer (gel portion), which is ethyl acetate-insoluble, is taken and dried in the oven of 100° C. for two hours and the weight (w2) of the remaining solid portion is measured. The gel fraction is calculated by a following equation:

gel fraction (%)=(w2/w1)×100

The method of forming the adhesive layer on the polarizing plate is not particularly limited. For example, a method of applying the adhesive on a surface of a polarizing film with a barcoater and then drying it and a method of applying and drying the adhesive on a substrate surface having a peeling property to form the adhesive layer, transferring the adhesive layer formed on the substrate surface to the surface of the polarizing plate and continuing to mature it may be adopted.

Although a thickness of the adhesive layer is not particularly limited, the thickness is preferably 10 µm to 40 µm, more preferably 10 µm to 30 µm and most preferably 10 µm to 20 µm. When the thickness is smaller than the range, the adhesive force may not be sufficiently obtained. When the thickness exceeds the range, the mismatch of the polarizing plate after the durability test is larger, so that the light leakage is also increased.

When the adhesive force of the adhesive is too strong, residual paste or panel damage is generated at the time of rework. Thus, it is preferable that the adhesive force is 20N/25 mm or less in the 180° peel test. In addition, when the adhesive force is less than 20N/25 mm, the durability is lowered. The more preferable range is 1 to 10N/25 mm.

When the distortion of the adhesive layer, which is obtained from a creep test wherein the polarizing plate is fixed to a substrate with the adhesion area 10 mm×25 mm through the adhesive layer and load of 1 kg is applied for one hour at 80° C. and a dry condition, is A:µm, and the distortion of the adhesive layer when one minute has passed after removing the load is B:µm, the adhesive is preferable in which {(A−B)/A}×100 is 50(%) or less. 20(%) or less is more preferable. The distortion (D:µm) of the adhesive layer, which is obtained from a creep test wherein the polarizing plate is fixed to a substrate with the adhesion area 10 mm×25 mm through the adhesive layer and load of 1 kg is applied for one minute at 25° C. and 60% RH, is preferably 20 μm or less. The distortion (A:μm) of the adhesive layer, which is obtained from the creep test wherein load of 1 kg is applied for one hour at 80° C., is preferably 30 μm to 100 μm.

Tg of the adhesive layer is preferably −40° C.≦Tg≦−10° C. When Tg is lower than −40° C., the mismatch of the polarizing plate after the durability test is larger, so that the light leakage may be also increased. When Tg is higher than −10° C., the peeling may be generated during the durability test such as heat shock.

(Optical Compensation Film)

The optical compensation film that is used in the invention will be described. It is preferable that the optical compensation film, which is used in the invention, satisfies following equations of (7) and (8).

$$30 \text{ nm} \leq Re(590) \leq 80 \text{ nm} \tag{7}$$

$$80 \text{ nm} \leq Rth(590) \leq 300 \text{ m} \tag{8}$$

Here, Re(590) and Rth(590) indicate in-plane retardation and thickness-direction retardation, respectively, which are measured at a wavelength of 590 nm. Equations of (7) and (8) are preferably following equations (7)' to (8)'.

$$35 \text{ nm} \leq Re(590) \leq 75 \text{ nm} \tag{7}'$$

$$90 \text{ nm} \leq Rth(590) \leq 290 \text{ nm} \tag{8}'$$

When the above conditions are satisfied, it is possible to compensate the viewing angle characteristic of the VA mode liquid crystal display device.

As the polymer constituting the optical compensation film, cellulose ester, polycarbonate, polysulfone, polyethersulfone, polyacrylate, polymethacrylate and cyclic olefin-based polymer may be exemplified. As the cellulose ester, cellulose ester is preferable, acetyl cellulose is more preferable and triacetyl cellulose is most preferable. As the cyclic olefin-based polymer, it may be used polymers having, as a constituent component, polymer obtained by hydrogenating ring-creavage polymer of tetracyclododecene, which is disclosed in JP-A-2-9619, or ring-creavage polymer of tetracyclododecene and norbornene, more specifically ARTON™ (JSR Corporation), ZEONEX™, ZEONOR™ (ZEON Corporation) series. The optical compensation film is preferably formed by the solvent casting method or melting film-forming method.

The material and method that are usable for manufacturing the optical compensation film will be specifically described. As the optical compensation film, cyclic olefin-based polymer film and cellulose acylate may be exemplified. The cyclic olefin-based polymer film is preferable because a refractive index of the cyclic olefin-based polymer film is close to that of glass.

(Cyclic Olefin-Based Film)
(Cyclic Olefin-Based Polymer)

An example of cyclic olefin-based polymer (hereinafter, also referred to as cyclic polyolefin-based and cyclic olefin-based addition polymer) may include (1) norbornene-based polymer, (2) cyclic olefin-based polymer of a single ring, (3) cyclic conjugated diene polymer, (4) vinyl cyclo aliphatic hydrocarbon polymer and hydrides of (1) to (4). Among them, norbornene-based polymer and hydrides thereof and vinyl cyclo aliphatic hydrocarbon polymer and hydrides thereof are preferable from standpoints of optical characteristics, heat resistance, mechanical strength and the like.

The preferable polymer is norbornene-based addition (co) polymer including at least one repeated unit expressed by a following formula (I) and at least one ring-repeated unit expressed by a following formula (II).

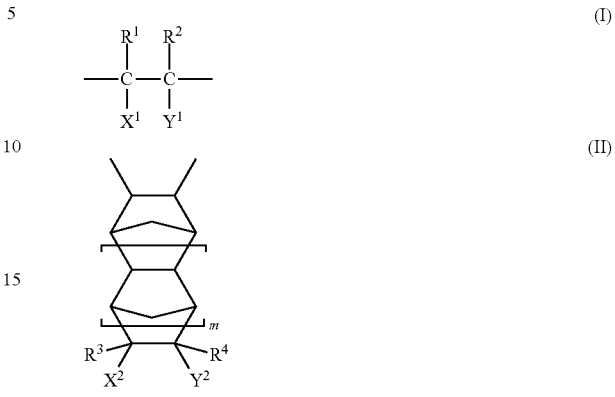

In the formulae, m is an integer of 0 to 4. $R^1$ to $R^4$ each independently indicates a hydrogen atom or a hydrocarbon group having 1 to 10 carbon atoms. $X^1$ to $X^2$, $Y^1$ to $Y^2$ each independently indicates a hydrogen atom, a hydrocarbon group having 1 to 10 carbon atoms, a halogen atom, a hydrocarbon group having 1 to 10 carbon atoms and substituted with a halogen atom, —$(CH_2)_n$COOR$^{11}$, —$(CH_2)_n$OOCR$^{12}$, —$(CH_2)_n$NCO, —$(CH_2)_n$NO$_2$, —$(CH_2)_n$CN, —$(CH_2)_n$CONR$^{13}$R$^{14}$, —$(CH_2)_n$NR$^{13}$R$^{14}$, —$(CH_2)_n$OCOZ, —$(CH_2)_n$OZ, —$(CH_2)_n$W. Or $X^1$ and $Y^1$ or $X^2$ and $Y^2$ may be connected to each other to form —CO—O—CO— or —CO—NR$^{15}$—CO—. In addition, $R^{11}$, $R^{12}$, $R^{13}$, $R^{14}$, $R^{15}$ each independently indicates a hydrocarbon group having 1 to 20 carbon atoms, Z indicates a hydrocarbon group (preferably, a hydrocarbon group having 1 to 10 carbon atoms) or a hydrocarbon group substituted with a halogen (preferably, a hydrocarbon group having 1 to 10 carbon atoms), W indicates SiR$^{16}_p$D$_{3-p}$ (R$^{16}$ indicates a hydrocarbon group having 1 to 10 carbon atoms, D indicates halogen atom, —OCOR$^{16}$ or —OR$^{16}$, p indicates an integer of 0 to 3), and n indicates an integer of 0 to 10. As the norbornene-based addition (co) polymer, polymer disclosed in JP-A-10-7732, JPA-2002-504184, US2004/0229157A1 or WO2004/070463A1 may be used. It is obtained by addition-polymerizing norbornene-based multi-ring unsaturated compounds. In addition, it may be possible to addition-polymerize norbornene-based multi-ring unsaturated compound and conjugated diene such as ethylene, propylene, butene, butadiene and isoprene; non-conjugated diene such as ethylidene norbornene; linear diene compound such as acrylonitrile, acrylic acid, methacrylic acid, maleic anhydride, acrylic acid ester, methacrylic acid ester, maleimide, vinyl acetate, vinyl chloride and the like, as required. As the norbornene-based addition (co)polymer, commercialized product may be used. To be more specific, there are grades of APL8008T (Tg 70° C.), APL6013T (Tg 125° C.), APL5014 (Tg 135° C.) or APL6015T (Tg 145° C.), which are sold with the trademark of APL by Mitsui Chemicals, Inc. and have different glass transition temperatures. Pellets such as TOPAS8007, TOPAS6013, TOPAS6015 and the like are sold by Polyplastics Co., Ltd. Further, Promerus Co., Ltd. sells Appear3000.

As disclosed in JP-A-1-240517, JP-A-7-196736, JP-A-60-26024, JP-A-62-19801, JP-A-2003-1159767 or JP-A-2004-309979, as the norbornene-based polymer hydride, it is possible to use one obtained by addition-polymerizing or metathesis ring-creavage polymerizing the multi-ring unsaturated compound and then performing hydrogenation. Specifically, it is possible to use one that is sold with the trademark of Arton G or Arton F by JSR Corporation or with the trademark of Zeonor ZF14, ZF16, Zeonex 250 or Zeonex 280 by ZEON Corporation.

In the norbornene-based addition (co)polymer, a ratio of the repeated unit expressed by the formula (I) and the ring-repeated unit expressed by the formula (II) is 0:100 to 90:10 by a mole ratio (the former:the latter), preferably 0:100 to 70:30.

More preferably, since the norbornene-based addition (co) polymer increases the thickness-direction retardation, copolymer is preferable which consists of one repeated unit expressed by the formula (II) or at least two ring-repeated units expressed by the formula (II). When the norbornene-based addition (co)polymer is copolymer consisting of at least two ring-repeated units expressed by the formula (II), it is preferable that any one substituent $X^2$ and/or $Y^2$ is hydrophilic or has higher polarity and the other substituent $X^2$ and/or $Y^2$ is hydrophobic or has lower polarity. Thus, it is possible to control the hydrophilicity or water-permeability of the film.

In addition, it is possible to obtain a cyclic olefin-based film having various optical characteristics such as optically-isotropic film or cyclic olefin-based film having high optical anisotropy by changing a structure of the cyclic olefin-based addition polymer or drawing the cyclic olefin-based film. In particular, it is possible to obtain a cyclic olefin-based film having thickness-direction retardation larger than in-plane retardation, which film is difficult to manufacture up to now. To be more specific, when changing a structure of norbornene-based addition (co)polymer, it is preferable to decrease the ratio of the repeated unit component of the formula (I) and to increase the ratio of the repeated unit component of the formula (II).

When drawing the cyclic olefin-based film, a method may be used which is applied to a cellulose acylate film. Tenter drawing may be exemplified. By properly changing a draw ratio, it is possible to obtain a desired optical characteristic.

(Additives)

Preferably, the optical compensation film contains an additive having a negative intrinsic birefringence. By containing an additive having a negative intrinsic birefringence, it is possible to make wavelength dispersion of retardation of the optical compensation film a substantial reciprocal dispersion form (the longer wavelength, the larger retardation) and to improve a color change (color shift) when seen askew for a case where the optical compensation film is applied to a liquid crystal display device. As the additive having a negative intrinsic birefringence, polymethyl methacrylate-based polymer, polystyrene-based polymer and the like may be exemplified, and polymethyl methacrylate-based polymer is preferable. In order to add the additive to the cyclic olefin-based polymer having a refractive index of 1.53 and thus to make the refractive index close to a refractive index 1.51 of glass, it is preferable to use the additive having a refractive index lower than the refractive index 1.53. Accordingly, it is preferable to use polymethyl methacrylate-based polymer having a refractive index of 1.49.

<Production of Cyclic Olefin-Based Film by Melting Film-Forming Method>

Hereinafter, the melting film-forming method will be described. The method includes the processes of extruding melted cyclic olefin-based addition polymer into a sheet shape from a die of an extruder and cooling it on a cooling roll, thereby forming a cyclic olefin-based film of cyclic olefin-based addition polymer.

In the method, when melting the cyclic olefin-based addition polymer, a pellet of cyclic olefin-based addition polymer may be preheated. The preheating temperature is Tg−90° C. to Tg+15° C., preferably Tg−75° C. to Tg−5° C., and more preferably Tg−70° C. to Tg−5° C. When the pellet is preheated in the range of Tg−90° C. to Tg+15° C., it is possible to uniformly perform the melting and kneading of resin after the preheating.

According to the method, after the preheating, the extruder is used to increase the temperature to 200 to 300° C. and to melt the cyclic olefin-based addition polymer. At this time, it is preferable that the temperature at an output of the extruder is higher than that at an input by 5 to 100° C., preferably 20 to 90° C. and more preferably 30 to 80° C. By doing so, it is possible to uniformly knead the melted resin.

Subsequently, the melted cyclic olefin-based addition polymer is made to pass through a gear pump, filtered with a metal mesh filter after removing pulsation of the extruder and extruded into a sheet shape on the cooling roll from a T-shaped die attached to the extruder. The cyclic olefin-based addition polymer film extruded on the cooling roll is pressed over 1 to 50% of a film width direction, preferably 2 to 40% and more preferably 3 to 30%. Preferably, the pressing is uniformly performed from both ends of the film width direction, thereby pressing 1 to 50% of the film width direction.

When the extruded film is pressed on the whole surface of the cooling roll as the method in the background art, locally non-uniform cooling is caused due to non-uniform pressing or non-uniform temperature of the cooling roll, and the non-uniform shrinkage stress cannot be escaped to the outside of the film because the film is pressed over the whole surface thereof. In addition, when the whole surface of the extruded film is pressed on the cooling roll, the temperature of the film is rapidly decreased and non-uniformities in Re and Rth (particularly, non-uniformity in Rth) are easy to occur. However, when the press is performed according to the invention, as described above, it is possible to avoid the non-uniform shrinkage stress of the cyclic olefin-based film of the cyclic olefin-based addition polymer and to satisfactorily preventing the non-uniformities in Re and Rth from occurring.

The methods of vacuum nozzle, electrostatic pinning and touch roll may be used. Although a pressure thereof is not particularly limited, 0.001 to 20 kg/cm² (98 Pa to 1.96 MPa) is preferable and 0.01 to 1 kg/cm² (980 Pa to 98 kPa) is more preferable.

In the above method, the press may be performed while performing cooling on the cooling roll. At this time, the cooling is preferably performed as slow as possible. In the method of manufacturing a film that is generally performed, the cooling is performed at the cooling rate of 50° C./sec or higher. However, in the method of the invention, the cooling rate is 0.2 to 20° C./sec, preferably 0.5 to 15° C./sec and more preferably 1 to 10° C./sec. As the cooling is performed at the corresponding cooling rate, the locally non-uniform cooling is prevented to avoid the shrinkage stress due to the rapid shrinkage and to prevent the non-uniformities in Re and Rth from occurring.

It is achieved by the temperature adjustment. Through the former, it is possible to achieve the preferable effect.

The heat retention in a casing of the cooling roll is achieved by arranging at least one of the cooling rolls in the casing whose temperature is adjusted to Tg−100° C. to Tg+30° C., more preferably Tg−80° C. to Tg+10° C., and most preferably Tg−70° C. to Tg. Since the manufactured sheet is placed under restraint by friction force on the cooling roll and thus cannot be freely shrunk, the non-uniformities in Re and Rth are easy to occur due to the shrinkage stress. However, when the above method is used, it is possible to slowly perform the cooling in the width direction, thereby decreasing the non-uniformity in temperature on the cooling roll. As a result, it is possible to reduce the non-uniformities in Re and Rth.

Regarding the above, according to the method disclosed in JP-A-2003-131006, the temperature of an interval (air gap) between cooling drums is adjusted from the T-shaped die. However, according to this method, it is impossible to sufficiently reduce the non-uniformities in Re and Rth. This is because there is no means for restraining the film in the air gap and thus the effect of reducing the non-unifoimities in Re and Rth is little.

Furthermore, in order to reduce the non-uniformities in Re and Rth, following methods may be combined.

(1) The cyclic olefin-based addition polymer, which is extruded into a sheet form from the die attached to the extruder, is cast on at least 2 to 10, preferably 2 to 6 and more preferably 3 to 4 cooling rolls (closely spaced rolls), which are arranged at a predetermined interval.

By controlling the cooling temperature with the plurality of cooling rolls, it is possible to easily adjust the cooling rate. In addition, by arranging the cooling rolls at a predetermined interval, it is possible to reduce the temperature change between the cooling rolls. The interval between the cooling rolls (interval at the closest portions of peripheries of the neighboring rolls) is preferably 0.1 to 15 cm, more preferably 0.3 to 10 cm and most preferably 0.5 to 5 cm.

(2) The temperature of at least first cooling roll of 2 to 10 cooling rolls is adjusted to Tg−40° C. to Tg (preferably Tg−35° C. to Tg−3° C., more preferably Tg−30° C. to Tg, and most preferably Tg−30° C. to Tg−5° C.). Further, the temperature of the second cooling roll is preferably made to be 1 to 30° C. (preferably, 1 to 20° C. and more preferably 1 to 10° C.) higher than that of the first cooling roll. By making the temperature of the second cooling roll higher than that of the first cooling roll, it is possible to further increase the viscosity of the film of the cyclic olefin-based addition polymer and to increase the adhesion with the second cooling roll. Thereby, since it is possible to suppress the slipping on the cooling roll and the non-uniformity in conveying tension, it is possible to reduce the non-uniformities in Re and Rth.

(3) The conveying speed of the second cooling roll is made to be 0.1 to 5% (preferably 0.2 to 4%, more preferably 0.3 to 3%) faster than that of the first cooling roll. Thereby, since it is possible to suppress the slipping between the first and second cooling rolls and thus to reduce the non-uniformity in conveying tension, it is possible to reduce the non-uniformities in Re and Rth.

(4) The film is made to pass to a third cooling roll whose temperature is 1 to 30° C. (preferably 1.5 to 20° C., and more preferably 2 to 10° C.) lower than that of the second cooling roll after passing to the second cooling roll. Thereby, since it is possible to reduce the cooling rate at a process of peeling the film of cyclic olefin-based addition polymer from the cooling rolls, it is possible to reduce the non-uniformities in Re and Rth. Furthermore, the conveying speed of the third cooling roll is made to be 0/1 to 5% (preferably 0.2 to 4%, more preferably 0.3 to 3%) slower than that of the second cooling roll. Thereby, since it is possible to buff the non-uniformity in conveying tension between the second and third cooling rolls, it is possible to reduce the non-uniformities in Re and Rth.

The manufacturing method may include a process of peeling off the film of cyclic olefin-based addition polymer from the cooling rolls after cooling the film of cyclic olefin-based addition polymer at the cooling rate of 0.2 to 20° C./sec by the above methods.

The peeled cyclic olefin-based addition polymer may be delivered with a plurality of conveying rolls that are arranged at an interval of 0.2 to 10 m, preferably 0.3 to 8 m and more preferably 0.4 to 6 m. At the cooling capable of suppressing the non-uniformity in conveying tension resulting from friction with the conveying rolls by performing the conveying and cooling between the long spans, unbalance of the conveying tension due to the non-uniformities in right and left shrinkages is caused. In order to alleviate the unbalance, it is required a wide roll space so that the film can freely move and thus buffering can be made. When the interval between the conveying rolls is 0.2 to 10 m, the friction between the film of cyclic olefin-based addition polymer and the conveying rolls is not caused and the film of cyclic olefin-based addition polymer can freely move, so that it is possible to reduce a mismatch of the optic axis due to the non-uniformity in tension.

The peeled cyclic olefin-based addition polymer is preferably cooled up to 50° C. at the cooling rate of 0.1 to 3° C./sec, preferably 0.2 to 2.5° C./sec and more preferably 0.3 to 2° C./sec. When the film is cooled at the cooling rate of 0.1 to 3° C./sec, it is possible to prevent a mismatch of the optic axes due to the non-uniformities in right and left tensions resulting from the rapid shrinkage stress. The control of the cooling rate can be achieved by making the film of cyclic olefin-based addition polymer pass into the casing and lowering the downstream temperature of the casing, rather than the upstream temperature thereof. Further, the control can be also achieved by adjusting the temperatures of the upstream and downstream conveying rolls.

In the above manufacturing method, line speed is 40 to 150 m/minute, preferably 50 to 100 m/minute and more preferably 60 to 80 m/minute. When the film is manufactured at the line speed of 40 to 150 m/minute, it is possible to blow the air between the first cooling roll and the film of cyclic olefin-based addition polymer, thereby suppressing the press over the entire surface. As a result, it is possible to suppress the non-uniformities in Re and Rth.

A width of the manufactured film is 1.5 to 5 m, preferably 1.6 to 4 m and more preferably 1.7 to 3 m. Like this, by widening the width, it is possible to suppress the non-uniformity in shrinkage stress of the width direction at the conveying process after peeling off the film of cyclic olefin-based addition polymer from the cooling rolls. In other words, when the wide is narrow, it is difficult to buff the non-uniformity of caused tension in the width direction. However, when the width is widened, it is possible to buff the non-uniformity of caused tension in the width direction and to reduce the non-uniformity in optic axis.

(Drawing Process)

The obtained fabric film is preferably drawn. The conditions of drawing the fabric film are not particularly limited. However, when the glass transition temperature of the fabric film is Tg, it is preferable that the drawing temperature is Tg−10° C. to Tg+60° C. and the draw ratio is 1.05 to 3 times (5 to 200%).

When the drawing is performed under such conditions, it is possible to adjust Re(590) and Rth(590) to desired ranges. The drawing may be performed in any direction of a film width direction (TD direction) and a direction perpendicular thereto (MD direction). In addition, the simultaneous or sequential biaxial drawing may be carried out.

(Physical Properties of Film)

(Hazes of Film)

In the invention, it is preferable to use an optical compensation film having the internal haze of 0.10% or less and the surface haze of 1.0% or less. In addition, it is preferable to use an optical compensation film having the internal haze of 0.10% or less and the surface haze of 0.01 to 1.0%. The internal haze is more preferably 0.07% or less, and most preferably 0.05% or less.

When the internal haze is 0.10% or less, it is possible to suppress lowering of the contrast ratio when seeing the liquid crystal panel from the front.

In the meantime, when the surface haze is 0.01% or higher, the surface is excessively smooth, so that it is possible to secure a sliding property with the rolls at the time of handling for delivering and winding the roll film. As a result, a scratch is prevented from being generated. In addition, it is possible to prevent front and back surfaces of the film from being adhered during preserving the film in a long roll state. When the surface haze is below 1.0%, it is possible to prevent the front contrast ratio from being lowered. The surface haze is preferably 0.01% to 1.0%, more preferably 0.01% to 0.9% and most preferably 0.01% to 0.8%.

In addition, the method of measuring the internal haze (Hi) and the surface haze (Hs) will be described in (haze measurement) sections of embodiments.

The total haze of the optical compensation film is preferably 0.05 to 0.8%, more preferably 0.05 to 0.7%. When the total haze is above 0.8%, the lowering of the front contrast ratio of the liquid crystal display device is conspicuous. The lower the total haze, the better the optical performance. The above range is preferable, even when taking into consideration material selection, manufacturing management and handling property of a roll film.

The preferable ranges of the internal haze and the surface haze are as described above. The haze of a film is increased due to two factors. The first factor is an increase of a secondary particle size due to coagulation of particles of a matting agent and the second factor is an increase of voids in a film due to a drawing treatment. By appropriately adjusting a degree of acylation and a type of an acyl group of cellulose acylate and/or using an agent for expressing retardation having high polarizability anisotropy as described above, it is possible to effectively suppress the two factors of increasing the haze.

In addition, the haze was measured for an optical compensation film sample of 40 mm×80 mm at 25° C. and 60% RH with the hazemeter (HGM-2DP, Suga Test Instruments Co., Ltd.) according to JIS K-6714.

Additionally, the specific measurement methods of the total haze (H), the internal haze (Hi) and the surface haze (Hs) will be described in (haze measurement) sections of embodiments.

(Surface Treatment of Cyclic Olefin-Based Film)

The optical compensation film is surface-treated and the surface haze after the surface treatment is preferably 0.05% to 1.0%, more preferably 0.05% to 0.9% and most preferably 0.05% to 0.8%.

In the invention, when a cyclic olefin-based film is used as the optical compensation film, it is preferable to surface treat a surface of the cyclic olefin-based film (opposite side of a surface applied with optically-anisotropic layer) before applying an adhesive, so as to improve the adhesion between the polarizer and the cyclic olefin-based film.

Regarding the surface treatment, any method may be used as long as the method can improve the adhesion. However, a glow discharge treatment, a ultraviolet illumination treatment, a corona discharge treatment and a flame treatment are preferable.

The glow discharge treatment means a so-called low temperature plasma treatment, which is generated under low-pressure gas. In the invention, a plasma treatment under atmospheric pressure is also preferable. In addition, the specific glow discharge treatment is described in U.S. Pat. Nos. 3,462,335, 3,761,299 and 4,072,769 and U.K. Patent No. 891469. The method described in JP-A-59-556430 is also used in which the gases of the discharge atmosphere are composed only with gas species that are generated in a receptacle by applying discharge treatment to a polyester support itself after starting the discharge. In addition, the method described in JP-B-60-16614 may be used in which when performing the vacuum discharge treatment, the discharge treatment is performed while making the surface temperature of the film be within a range of 80° C. to 180° C.

A degree of vacuum at the time of the glow discharge treatment is preferably 0.5 to 3000 Pa, and more preferably 2 to 300 Pa. In addition, a voltage is preferably 500 to 5000V, and more preferably 500 to 3000V. A discharge frequency is thousands of MHz from direct current, preferably 50 Hz to 20 MHz, and more preferably 1 KHz to 1 MHz. The intensity of the discharge treatment is preferably 0.01 KV·A·minute/m$^2$ to 5 KV·A·minute/m$^2$, and more preferably 0.15 KV·A·minute/m$^2$ to 1 KV·A·minute/m$^2$.

In the invention, the ultraviolet illumination method is also preferably used as the surface treatment. For example, the surface treatment may be performed by the methods described in JP-B-43-2603, JP-B-43-2604 and JP-B-45-3838. A mercury lamp is a high-pressure mercury lamp consisting of a quartz tube and the wavelength of ultraviolet is preferably 180 to 380 nm. Regarding the ultraviolet illumination method, as the light source, it is preferable to use a low-pressure mercury lamp when it is required a low-temperature treatment, in which a high-pressure mercury lamp having a main wavelength of 365 nm can be used when there is no problem in the performance of the support even when the surface temperature of the film is increased to around 150° C. In addition, high-pressure mercury lamp and low-pressure mercury lamp of an ozoneless type can be used.

Regarding a quantity of light for treatment, the more the quantity of light, the better the adhesive force between the cyclic olefin-based film and the polarizer. However, as the quantity of light is increased, the film is colored and becomes brittle.

Accordingly, for the high-pressure mercury lamp having a main wavelength of 365 nm, the quantity of light to be illuminated is preferably 20 to 10000(mJ/cm$^2$), more preferably 50 to 2000(mJ/cm$^2$). For the low-pressure mercury lamp having a main wavelength of 254 nm, the quantity of light to be illuminated is preferably 100 to 10000(mJ/cm$^2$), more preferably 300 to 1500(mJ/cm$^2$).

Furthermore, in the invention, the corona discharge treatment may be also carried out as the surface treatment. For example, it can be carried out by the treatment methods described in JP-B-39-12838 and JP-A-47-19824, JP-A-48-28067 and JP-A-52-42114. As a corona discharge treatment apparatus, a solid state corona treatment apparatus (Pillar Corporation), a LEPEL-type surface treatment apparatus, a VETAPHON-type treatment apparatus and the like can be used. The treatment may be performed at atmospheric pressure under air. The discharge frequency at the time of the treatment is 5 to 40 KV, preferably 10 to 30 KV, and the waveform is preferably AC sine wave. The gap transparency length of the electrode and the dielectric roll is 0.1 to 10 mm, preferably 1.0 to 2.0 m. The discharge is performed above the dielectric support roller provided in a discharge band and the throughput is 0.3 to 0.4 KV·A·minute/m$^2$, preferably 0.34 to 0.38 KV·A·minute/m$^2$.

In the invention, the flame treatment is also preferably used as the surface treatment. The gas to be used may be any one of natural gas, liquefied propane gas and city gas. However, a mixing ratio with the air is important because it is believed that an effect of the surface treatment by the flame treatment is achieved by plasma including active oxygen. Further, the activity (temperature) of the plasma, which is an important property of flame, and how many the oxygen is included in the plasma are the points.

A factor of governing the points is a ratio of gas and oxygen. When the gas and the oxygen react without excess or deficiency, an energy density is highest, so that the activity of the plasma is increased. To be more specific, a mixing ratio (volume ratio) of natural gas/oxygen is preferably 1/6 to 1/10, and more preferably 1/7 to 1/9. In addition, a mixing ratio (volume ratio) of liquefied propane gas/oxygen is 1/14 to 1/2, preferably 1/16 to 1/19. Additionally, a mixing ratio (volume ratio) of city gas/oxygen is 1/2 to 1/8, preferably 1/3 to 1/7. Further, an amount of the flame treatment is 1 to 50 Kcal/m$^2$, preferably 3 to 20 Kcal/m$^2$.

In addition, a distance between a leading end of inner flame of a burner and the film is 3 to 7 cm, preferably 4 to 6 cm. A nozzle shape of the burner is preferably a ribbon type of Flynn Burner Corporation (US), a multi-hole type of Y's Corporation (US), a ribbon type of Aerogen (UK), a zigzag multi-hole type of Kasuga Electric Works Ltd. (JP) or a zigzag multi-hole type of Koike Sanso Kogyo Co., Ltd. (JP). A backup roll that supports the film at the time of the flame treatment is a hollow type roll, is water-cooled through cooling water and is preferably always treated at constant temperatures of 20 to 50° C.

A degree of the surface treatment is varied depending on types of the surface treatment and types of cyclic olefin-based addition polymer. A contact angle between a surface of the film, to which the surface treatment has been applied, and pure water is preferably below 50°. More preferably, the contact angle is 25° or higher and below 45°. When the contact angle between the film surface and the pure water is within the above range, adhesion strength between the cyclic olefin-based film and the polarizer is increased.

(Polarizing Plate)

The polarizing plate includes a polarizer, an optical compensation film, and a protective film for polarizing plate. For the polarizer, an iodine-based polarizer, a dye type polarizer using dichromic dye or polyene-based polarizer can be used. The iodine-based polarizer and the dye type polarizer are generally manufactured with polyvinyl alcohol-based film. An absorption axis of the polarizer corresponds to the drawing direction of the film. Accordingly, the polarizer drawn in a longitudinal direction (conveying direction) has an absorption axis parallel to the longitudinal direction and the polarizer drawn in a cross direction (direction perpendicular to the conveying direction) has an absorption axis perpendicular to the longitudinal direction.

A preferred manufacturing method of the polarizing plate comprises a process of continuously stacking the long polarizer and optical compensation film, respectively. The long polarizing plate is cut to a screen size of a liquid crystal display device to be used.

The polarizer has generally protective films for polarizing plate on both surfaces thereof. It is preferable to select a material having a refractive index close to a refractive index (1.51) of glass. The protective films of the polarizing layer may be made to have an optical compensation function. In this case, a protective film may not be separately formed on the surface of the polarizing layer at the side of the optical compensation film. In the polarizing plate, only an isotropic adhesive layer and/or substantially isotropic transparent protective film is preferably included between the polarizing layer and the optical compensation film. The substantially isotropic transparent protective film is a film having in-plane retardation of 0 to 10 nm and thickness-direction retardation of −20 to 20 nm. A film including cellulose acylate or cyclic polyolefin-based is preferable. The above transparent protective film is also preferable as a protective film to be stuck on an opposite side of the polarizer to the side on which the optical compensation film is stuck.

(Liquid Crystal Display Device)

The invention is preferably applied to a liquid crystal display device of a vertical alignment mode such as VA mode. One aspect of the liquid crystal display device of the invention is a liquid crystal display device of a VA mode, has a liquid crystal cell of a VA mode and a pair of polarizing plates interposing the cell therebetween, and has, as at least one of the pair of polarizing plates, a polarizing plate having an optical compensation film, which is a polarizing plate of one side, as a protective film.

The liquid crystal cell of VA mode preferably includes a nematic liquid crystal between a pair of transparent glass substrates, which has a negative dielectric anisotropy. On each of the pair of the transparent glass substrates, a transparent electrode is formed, and the pair of the transparent glass substrates are disposed at an interval such that transparent electrodes on the respective glass substrates face to each other. As the nematic liquid crystal, such a liquid crystal is used that a longitudinal axis of a liquid crystal molecule of the liquid crystal is oriented in a direction approximately perpendicular to the transparent glass substrates with no voltage applied.

The polarizing plate having an optical compensation film may be used as a backlight side polarizing plate with respect to the liquid crystal cell or a viewer side polarizing plate with respect to the liquid crystal cell.

The polarizing plate is preferably stuck to the liquid crystal cell with the adhesive of the invention. The polarizing plate having an optical compensation film (in which the optical compensation film, the polarizer, and the protective film for polarizing plate are stacked in this order) is preferably stuck to the liquid crystal cell such that the transparent glass substrate, an adhesive; the optical compensation film; the polarizer; and the protective film are stacked in this order When the polarizing plate having no optical compensation film is stuck to the liquid crystal cell, only a substantially isotropic adhesive layer (preferably the adhesive of the invention) and/or substantially isotropic transparent protective film is preferably included between the polarizer and the transparent glass substrate. The substantially isotropic transparent protective film is preferably a film having in-plane retardation of 0 to 10 nm and thickness-direction retardation of −20 to 20 nm and including cellulose acylate or cyclic polyolefin-based having such optical characteristic. In addition, it is preferable that the internal haze of the film is 0.30% or less and the surface haze is 0.05% or higher.

EXAMPLES

Hereinafter, the characteristics of the invention will be more specifically described with reference to examples and comparative examples. It should be noted that materials, amounts and ratios of use, contents of processes, sequence of processes and the like described in the exemplary embodiments may be appropriately changed without departing from the spirit of the invention. Accordingly, the scope of the invention is not limited to the specific examples described below.

Production of Film 1

Production of Cyclic Cyclo-Olefin-Based Polymer Film

Example 1

Production of Cyclic Olefin-Based Film (Production of Film (F1))

APEL APL5014 (Tg 135° C.) (Mitsui Chemicals, Inc.) was preheated at 90° C. and melted with the uniaxial extruder having an inner diameter of 50 mm and L/D of 28. In addition, the temperature of an inlet was 140° C. and the temperature of an outlet was 200° C. It was extruded to the outlet of the extruder from the T die via the sintered filter and the gear pump.

Three cooling rolls were used in the cooling process. The cooling rolls were arranged at an interval of 3 cm. The temperature of the first cooling roll nearest to the die was 130° C., a value obtained by subtracting the temperature of the first cooling roll from that of the second cooling roll was 3° C. and a value obtained by subtracting the temperature of the third cooling roll from that of the second cooling roll was 13° C.

In addition, a ratio ($\Delta Sr21(\%)=100\times(Sr2-Sr1)/Sr1$) of a difference between the conveying speed (Sr2) of the second cooling roll and the conveying speed (Sr1) of the first cooling roll to the conveying speed (Sr1=50 m/minute) of the first cooling roll was 1% and a ratio ($\Delta Sr23(\%)=100\times(Sr2-Sr3)/Sr2$) of a difference between the conveying speed (Sr3) of the third cooling roll and the conveying speed (Sr2) of the second cooling roll to the conveying speed (Sr2) of the second cooling roll was 1%. The cooling rolls were arranged in the casing whose temperature was 120° C. In addition, the first cooling roll was applied with the electrostatic applying method to press the width of 0.17 m for the sheet width of 1.7 m on the first cooling roll. The cooling rate between the cooling rolls closely spaced was 2° C./sec.

In addition, the cooling rate was indicated with a value obtained by dividing a difference between the temperature of the film provided on the first cooling roll and the temperature of the sheet just prior to being peeled off from the final cooling roll by the time required to pass between the rolls.

The sheet was conveyed between the final roll and the roll arranged with the roll space of 0.5 m at the cooling rate of 2° C./sec. A thickness of the obtained film was 79 μm. Then, a laminate film was attached to one side of the film, which was trimmed (slit) at both ends thereof by 10% and then wound by 3,000 m. This film was referred to as F1.

PMMA (polymethylmethacrylate Mw=10,000) was added to APEL APL5014 (Mitsui Chemicals, Inc.) by 20 mass % (weight % to polymer (APL5014)), so that a film (F2) was manufactured by the method same as the film F1. Similarly, a film manufactured by adding PMMA by 50 mass % (to polymer) and through the method same as the film F1 was referred to as F3. A film manufactured by adding polystyrene (Mw=10,000) by 15 mass % (to polymer) and through the method same as the film F1 was referred to as F4. The films F1 to F4 and polycarbonate (manufactured by Teijin Chemical Ltd.) were biaxially drawn with the temperatures and draw ratios in TD direction (film width direction) and MD direction (a direction perpendicular to the TD direction), described in Tables 1 and 2, so that optical compensation films 1 to 17 were manufactured. The film thicknesses in Tables 1 and 2 are those after drawn.

TABLE 1

| | Sample No. | | | | | | | | |
|---|---|---|---|---|---|---|---|---|---|
| | 1 | 2 | 3 | 4 | 5 | 6 | 7 | 8 | 9 |
| polymer | F1 | F2 | F3 | F4 | F1 | F3 | F1 | F1 | polycarbonate |
| PMMA (to polymer) | — | 20 | 50 | — | — | 50 | — | — | — |
| polystyrene (to polymer) | — | — | — | 15 | — | — | — | — | — |
| drawing temperature (° C.) | 150 | 150 | 150 | 150 | 155 | 155 | 160 | 143 | 143 |
| TD drawn ratio (%) | 23 | 23 | 23 | 23 | 28 | 23 | 32 | 19 | 25 |
| MD drawn ratio (%) | 4 | 4 | 4 | 4 | 7 | 4 | 9 | 2 | — |
| film thickness (μm) | 68 | 68 | 68 | 68 | 64 | 68 | 65 | 68 | 90 |
| internal haze (%) | 0.07 | 0.07 | 0.07 | 0.07 | 0.02 | 0.02 | 0.02 | 0.30 | 0.20 |
| surface haze (%) | 0.10 | 0.10 | 0.10 | 0.10 | 0.07 | 0.07 | 0.01 | 0.10 | 0.30 |
| total haze (%) | 0.17 | 0.17 | 0.17 | 0.17 | 0.09 | 0.09 | 0.03 | 0.40 | 0.50 |
| Surface haze after surface treatment (%) | 0.12 | 0.12 | 0.12 | 0.12 | 0.08 | 0.08 | 0.03 | 0.12 | 0.55 |
| Average refractive index | 1.530 | 1.522 | 1.510 | 1.539 | 1.530 | 1.510 | 1.530 | 1.530 | 1.586 |
| Re (nm) | 55 | 48 | 45 | 50 | 50 | 45 | 55 | 58 | 50 |
| Rth (nm) | 120 | 120 | 120 | 120 | 117 | 120 | 113 | 130 | 125 |
| roll scratch | ○ | ○ | ○ | ○ | ○ | ○ | Δ | ○ | ○ |

TABLE 2

| | Sample No | | | | | | | |
|---|---|---|---|---|---|---|---|---|
| | 10 | 11 | 12 | 13 | 14 | 15 | 16 | 17 |
| polymer | F1 | F2 | F3 | F4 | F1 | F3 | F1 | polycarbonate |
| PMMA (to polymer) | — | 20 | 50 | — | — | 50 | — | — |
| polystyrene (to polymer) | — | — | — | 15 | — | — | — | — |
| drawing temperature (° C.) | 150 | 150 | 150 | 150 | 155 | 155 | 160 | 143 |
| TD drawn ratio (%) | 50 | 50 | 50 | 50 | 57 | 50 | 42 | 20 |
| MD drawn ratio (%) | 30 | 30 | 30 | 30 | 35 | 30 | 25 | — |
| film thickness (μm) | 47 | 47 | 47 | 47 | 45 | 49 | 51 | 110 |
| internal haze (%) | 0.09 | 0.09 | 0.09 | 0.09 | 0.03 | 0.03 | 0.40 | 0.30 |

TABLE 2-continued

| | Sample No | | | | | | | |
|---|---|---|---|---|---|---|---|---|
| | 10 | 11 | 12 | 13 | 14 | 15 | 16 | 17 |
| surface haze (%) | 0.15 | 0.15 | 0.15 | 0.15 | 0.10 | 0.10 | 0.15 | 0.40 |
| total haze (%) | 0.24 | 0.24 | 0.24 | 0.24 | 0.13 | 0.13 | 0.55 | 0.70 |
| Surface haze after surface treatment (%) | 0.17 | 0.17 | 0.17 | 0.17 | 0.12 | 0.12 | 0.17 | 0.45 |
| Average refractive index | 1.530 | 1.522 | 1.510 | 1.539 | 1.530 | 1.510 | 1.530 | 1.586 |
| Re (nm) | 56 | 52 | 48 | 54 | 50 | 48 | 56 | 52 |
| Rth (nm) | 198 | 198 | 198 | 198 | 190 | 198 | 186 | 205 |
| roll scratch | ○ | ○ | ○ | ○ | ○ | ○ | Δ | ○ |

<Evaluation of Optical Compensation Films>
(Measurement of Optical Characteristics)

In addition, Re and Rth at 25° C. and 60% RH were measured with an automatic birefringence meter (KOBRA-21ADH, Oji Scientific Instruments). The measurement wavelength was 590 mu. The average refractive index of the film was measured with an Abbe refractometer (ATAGO CO., LTD) under environments of 23.5 to 26.5° C.

(Evaluation Method of Roll Scratch)

The optical compensation film 5 m was sampled from the entire width. A scratch formed on the roll was examined with the reflective light and the naked eyes. Then, three-step evaluation was performed as follows.
○: no scratch
Δ: scratch under 3×3 mm was found
x: scratch of 3×3 mm or larger was found The results are shown in Tables 1 and 2.

(Measurement of Hazes)

The total haze (H), the internal haze (Hi) and the surface haze (Hs) of the obtained film were measured as described below.

1) The total haze (H) of the obtained film was measured with a haze meter NDH2000 (IPROS Corporation) in accordance with JIS K-7136.

2) Liquid paraffin was dropped on the surface and backside of the obtained film and two glass plates (micro slide glass product No. S, Mataunami K.K.) having a thickness of 1 mm were used to fit the film therebetween from the front and back surfaces, so that the obtained film was optically adhered to the two glass plates. Under state in which the surface haze was removed, a haze was measured, from which a haze, which was measured by fitting only the liquid paraffin between the two glass plates, was then subtracted. The resulting value was calculated as the internal haze (Hi) of the film.

3) A value obtained by subtracting the internal haze (Hi) calculated in the above 2) from the total haze (H) measured in the above 1) was calculated as the surface haze (Hs) of the film.

In addition, the prepared optical compensation film was subject to a corona discharge treatment (surface treatment) with a solid state corona treatment machine of Pillar Corporation. The discharge frequency was 20 KV, the gap transparency length of the electrode and dielectric roll was 1.5 mm and the throughput was 0.36 KV·A·minute/m². Then, the internal haze of the film after the surface treatment was measured in the same way as above.

The measurement results are shown in Tables 1 and 2.

<Production of Adhesive>

Acrylate-based polymers in Table 3 were formulated in following sequences. To a reaction receptacle having a cooling pipe, a nitrogen introduction pipe, a thermometer and a stirring device, 100 parts by weight of butyl acrylate, 3 parts by weight of acrylic acid and 0.3 part by weight of 2,2'-azobisisobutyronitrile were added with ethyl acetate to make a solid portion concentration of 30 mass %, which were then reacted under nitrogen gas flow at 60° C. for 4 hours, thereby preparing an acrylate-based polymer solution of adhesive 1. In addition, through the same sequences except that 100 parts by weight of butyl acrylate was replaced by 100 parts by weight of the total of butyl acryalte and benzyl acrylate, acrylate-based polymer solutions of adhesive 2 to 4 were formulated. The ratio of monomers in acrylate-based polymers of the adhesive 1 to 4 is shown in Table 3. Additionally, average refractive indices of the obtained acrylate-based polymers were measured with the Abbe refractometer (ATAGO CO., LTD) under environments of 23.5 to 26.5° C. The results thereof are shown in Table 3. The thicknesses of the adhesive layers 1 to 4 each was 20 μm.

Then, adhesives 1 to 4 were prepared with the acrylate-based polymers according to below sequences. To 100 parts by weight of acrylate-based polymer solid portion, 2 parts by weight of trimethylolpropane tolylene diisocyanate (Japan Polyurethane Corporation, CORONATE L) and 0.1 part by weight of 3-3-glycidoxypropyltrimethoxysilane were added, which was then applied on a separate film, which was surface-treated by a silicone peeling agent, with a die coater and then dried at 150° C. for 3 hours to thereby prepare adhesives 1 to 4.

TABLE 3

| | adhesive 1 | adhesive 2 | adhesive 3 | adhesive 4 |
|---|---|---|---|---|
| butyl acrylate (weight %) | 98 | 83 | 53 | 28 |
| acrylic acid (weight %) | 2 | 2 | 2 | 2 |
| benzyl acrylate (weight %) | 0 | 15 | 45 | 70 |
| average refractive index | 1.467 | 1.481 | 1.510 | 1.533 |

Examples 1 to 26 and Comparative Examples 1 to 4

Production of Polarizing Plate

A roll-type polyvinyl alcohol film having a thickness of 80 μm, which was continuously dyed in an iodine aqueous solution, was drawn by five times in a conveying direction and dried to thereby prepare a long polarizer.

The prepared optical compensation film was subject to a corona discharge treatment with a solid state corona treatment machine of Pillar Corporation. The discharge frequency was 20 KV, the gap transparency length of the electrode and dielectric roll was 1.5 mm and the throughput was 0.36 KV·A·minute/m².

By polyvinyl alcohol-based adhesive, the optical compensation film was bonded to one side of the polarizing film and a protective film was bonded to the other side thereof, thereby preparing a long polarizing plate shown in Table 4. As the protective film, cellulose triacetate film having a surface saponified (FUJITAK TD80UL, Fuji Film Corporation) or cyclic olefin film having a surface corona discharge-treated (ZEONOR ZF14, Zeon Corporation).

The average refractive index of the prepared polarizing plate was 1.52, the average refractive index of TD80UL was 1.49, and the average refractive index of ZF14 was 1.53. The thickness of the polarizing plate was 25 μm, the thickness of TD80UL was 80 μm, and the thickness of ZF14 was 100 μm.

<Production of Liquid Crystal Display Device>

The liquid crystal cell was taken off from the VA mode liquid crystal TV (Bravia KDL40V5, f SONY Corporation), and the polarizing plate and the optical compensation film attached to the viewer side and the backlight side were peeled off. In the liquid crystal cell, a nematic liquid crystal having a negative dielectric anisotropy was interposed between a pair of transparent glass substrates, and a longitudinal axis of a liquid crystal molecule of the liquid crystal was oriented in a direction approximately perpendicular to the transparent glass substrates with no voltage applied.

To the above transparent glass substrates on the respective upper and lower sides of the liquid crystal cell, the prepared polarizing plate were bonded with the adhesives 1 to 4 so that the combination of the backlight side polarizing plate and the viewer side polarizing plate were described in Table 5. Here, the optical compensation film faced to the transparent glass substrate. The adhesive used for each polarizing plate is shown in Table 4. In addition, the absorption axes of the backlight side polarizing plate and the viewer side polarizing plate were arranged to be orthogonal to each other. The liquid crystal cell having the polarizing plates bonded thereto by doing so was again incorporated into the liquid crystal TV Bravia KDL40V5. By doing so, liquid crystal display devices of examples 1 to 26 and comparative examples 1 to 4 were manufactured.

The average refractive index of the transparent glass substrate was 1.51.

Table 5 shows differences among n1, n2, n3, n4, and n5 which are the average refractive indices of the transparent glass substrate, the adhesive, the optical compensation film, the polarizer, and the protective film, respectively.

(Evaluation of Front Contrast Ratio)

Regarding the above liquid crystal display devices of VA mode, a measuring machine (EZ-Contrast ratio XL88, ELDIM Corporation) was used to measure the brightness of black display and white display in the dark room and to measure contrast ratio ratios when seen from the front. The results thereof are shown in Table 5.

◎; 6000≦front CR
○; 5000<front CR<6000
x; front CR<4000

In addition, regarding the above liquid crystal display devices of VA mode, a sensory evaluation of a color shift at the time of black display in the dark room was performed and assessed on the basis of below criteria.

(Evaluation Criteria of Color Shift)

◎: coloring was little observed in all ultra corners and azimuth directions
○: a little coloring was observed when rotated by 360° about the normal line of the liquid crystal cell in the ultra corner 60° direction
Δ: coloring was observed when rotated by 360° about the normal line of the liquid crystal cell in the ultra corner 60° direction

TABLE 4

| polarizing plate No. | protective film | optical compensation film No. | adhesive No. |
|---|---|---|---|
| 1 | TD80 | 1 | 3 |
| 2 | TD80 | 2 | 3 |
| 3 | TD80 | 3 | 3 |
| 4 | TD80 | 4 | 3 |
| 5 | ZF14 | 1 | 3 |
| 6 | ZF14 | 3 | 3 |
| 7 | ZF14 | 5 | 3 |
| 8 | TD80 | 6 | 3 |
| 9 | ZF14 | 6 | 3 |
| 10 | TD80 | 3 | 2 |
| 11 | TD80 | 7 | 3 |
| 12 | TD80 | 8 | 3 |
| 13 | TD80 | 1 | 1 |
| 14 | TD80 | 9 | 3 |
| 15 | TD80 | 10 | 3 |
| 16 | TD80 | 11 | 3 |
| 17 | TD80 | 12 | 3 |
| 18 | TD80 | 13 | 3 |
| 19 | TD80 | 10 | 3 |
| 20 | TD80 | 12 | 3 |
| 21 | TD80 | 14 | 3 |
| 22 | TD80 | 14 | 3 |
| 23 | ZF14 | 14 | 3 |
| 24 | ZF14 | 15 | 3 |
| 25 | ZF14 | 15 | 3 |
| 26 | ZF14 | 12 | 2 |
| 27 | ZF14 | 16 | 3 |
| 28 | TD80 | 10 | 1 |
| 29 | TD80 | 17 | 3 |
| 30 | TD80 | TD80 | 3 |
| 31 | TD80 | ZF14 | 3 |
| 32 | ZF14 | ZF14 | 3 |
| 33 | ZF14 | TD80 | 3 |
| 34 | TD80 | 1 | 4 |

TABLE 5

|  | \|n1 − n2\| | \|n2 − n3\| | \|n1 − n3\| | \|n1 − n4\| | \|n4 − n5\| | \|n1 − n5\| | backlight side polarizing plate No. | viewer side polarizing plate No. | front contrast ratio | color shift |
|---|---|---|---|---|---|---|---|---|---|---|
| Ex. 1 | 0.000 | 0.020 | 0.020 | 0.010 | 0.030 | 0.020 | 1 | 1 | 5800 | ○ Δ |
| Ex. 2 | 0.000 | 0.012 | 0.012 | 0.010 | 0.030 | 0.020 | 2 | 2 | 5900 | ○ ○ |
| Ex. 3 | 0.000 | 0.000 | 0.000 | 0.010 | 0.030 | 0.020 | 3 | 3 | 6400 | ◎ ◎ |
| Ex. 4 | 0.000 | 0.029 | 0.029 | 0.010 | 0.030 | 0.020 | 4 | 4 | 5650 | ○ ◎ |
| Ex. 5 | 0.000 | 0.020 | 0.020 | 0.010 | 0.010 | 0.020 | 5 | 5 | 5900 | ○ Δ |
| Ex. 6 | 0.000 | 0.000 | 0.000 | 0.010 | 0.010 | 0.020 | 6 | 6 | 6300 | ◎ ◎ |
| Ex. 7 | 0.000 | 0.020 | 0.020 | 0.010 | 0.010 | 0.020 | 7 | 7 | 6200 | ◎ Δ |
| Ex. 8 | 0.000 | 0.000 | 0.000 | 0.010 | 0.030 | 0.020 | 8 | 8 | 6500 | ◎ ◎ |
| Ex. 9 | 0.000 | 0.000 | 0.000 | 0.010 | 0.010 | 0.020 | 9 | 9 | 6400 | ◎ ◎ |
| Ex. 10 | 0.029 | 0.029 | 0.000 | 0.010 | 0.030 | 0.020 | 10 | 10 | 5600 | ○ Δ |
| Ex. 11 | 0.000 | 0.020 | 0.020 | 0.010 | 0.030 | 0.020 | 11 | 11 | 5900 | ○ Δ |

TABLE 5-continued

|  | \|n1 − n2\| | \|n2 − n3\| | \|n1 − n3\| | \|n1 − n4\| | \|n4 − n5\| | \|n1 − n5\| | backlight side polarizing plate No. | viewer side polarizing plate No. | front contrast ratio | color shift |
|---|---|---|---|---|---|---|---|---|---|---|
| Ex. 12 | 0.000 | 0.020 | 0.020 | 0.010 | 0.030 | 0.020 | 12 | 12 | 5100 ○ | Δ |
| Comp. Ex. 1 | 0.043 | 0.063 | 0.020 | 0.010 | 0.030 | 0.020 | 13 | 13 | 3950 X | Δ |
| Comp. Ex. 2 | 0.000 | 0.076 | 0.076 | 0.010 | 0.030 | 0.020 | 14 | 14 | 3800 X | Δ |
| Ex. 26 | 0.023 | 0.003 | 0.020 | 0.010 | 0.030 | 0.020 | 34 | 34 | 6300 ⊚ | Δ |
| Ex. 13 | 0.000 | 0.020 | 0.020 | 0.010 | 0.030 | 0.020 | 15 | 30 | 5500 ○ | Δ |
| Ex. 14 | 0.000 | 0.012 | 0.012 | 0.010 | 0.030 | 0.020 | 16 | 30 | 5650 ○ | Δ |
| Ex. 15 | 0.000 | 0.000 | 0.000 | 0.010 | 0.030 | 0.020 | 17 | 30 | 6000 ⊚ | ○ |
| Ex. 16 | 0.000 | 0.029 | 0.029 | 0.010 | 0.030 | 0.020 | 18 | 30 | 5300 ○ | ○ |
| Ex. 17 | 0.000 | 0.020 | 0.020 | 0.010 | 0.030 | 0.020 | 19 | 31 | 5700 ○ | Δ |
| Ex. 18 | 0.000 | 0.000 | 0.000 | 0.010 | 0.030 | 0.020 | 20 | 31 | 5950 ○ | ○ |
| Ex. 19 | 0.000 | 0.020 | 0.020 | 0.010 | 0.030 | 0.020 | 21 | 31 | 5800 ○ | Δ |
| Ex. 20 | 0.000 | 0.020 | 0.020 | 0.010 | 0.030 | 0.020 | 22 | 31 | 5900 ○ | Δ |
| Ex. 21 | 0.000 | 0.020 | 0.020 | 0.010 | 0.010 | 0.020 | 23 | 32 | 5950 ○ | Δ |
| Ex. 22 | 0.000 | 0.000 | 0.000 | 0.010 | 0.010 | 0.020 | 24 | 33 | 6200 ⊚ | ○ |
| Ex. 23 | 0.000 | 0.000 | 0.000 | 0.010 | 0.010 | 0.020 | 25 | 32 | 6400 ⊚ | ○ |
| Ex. 24 | 0.029 | 0.029 | 0.000 | 0.010 | 0.010 | 0.020 | 26 | 33 | 5800 ○ | Δ |
| Ex. 25 | 0.000 | 0.020 | 0.020 | 0.010 | 0.010 | 0.020 | 27 | 33 | 5000 ○ | Δ |
| Comp. Ex. 3 | 0.043 | 0.063 | 0.020 | 0.010 | 0.030 | 0.020 | 28 | 30 | 3800 X | Δ |
| Comp. Ex. 4 | 0.000 | 0.076 | 0.076 | 0.010 | 0.030 | 0.020 | 29 | 30 | 3700 X | Δ |

From Table 5, the followings are apparent. The liquid crystal display devices of the invention exhibit a higher contrast ratio, compared to the liquid crystal display devices of the comparative examples, and have no bright defect at the time of black display.

Reference Examples

Except that the used liquid crystal TV was replaced with a liquid crystal TV of VA mode (LC37GE2, Sharp Corporation), the liquid crystal display device was manufactured and evaluated by the method same as the above examples. The results thereof are shown in Table 6. From Table 6, in the liquid crystal display device having a front contrast ratio of about 650, it can be seen that a reduction in the difference of the refractive indices between the polarizing plate member and the glass has little influence on the front contrast ratio. The average refractive index of the transparent glass substrate of the liquid crystal cell in LG37GE2 was 1.51

TABLE 6

|  | \|n1 − n2\| | \|n2 − n3\| | \|n1 − n3\| | \|n1 − n4\| | \|n4 − n5\| | \|n1 − n5\| | backlight side polarizing plate No. | viewer side polarizing plate No. | front contrast ratio |
|---|---|---|---|---|---|---|---|---|---|
| Ref. Ex. 1 | 0.000 | 0.020 | 0.020 | 0.010 | 0.030 | 0.020 | 1 | 1 | 650 |
| Ref. Ex. 2 | 0.000 | 0.000 | 0.000 | 0.010 | 0.030 | 0.020 | 3 | 3 | 650 |
| Ref. Ex. 3 | 0.040 | 0.060 | 0.020 | 0.010 | 0.030 | 0.020 | 13 | 1 | 650 |
| Ref. Ex. 4 | 0.000 | 0.076 | 0.076 | 0.010 | 0.030 | 0.020 | 14 | 8 | 650 |

What is claimed is:

1. A liquid crystal display device comprising:
a liquid crystal cell including: a pair of transparent glass substrates each having a transparent electrode, wherein the pair of transparent glass substrates are disposed at an interval and the transparent electrode of one of the pair of the transparent glass substrates faces to the transparent electrode of the other of the pair of the transparent glass substrates; and a nematic liquid crystal between the pair of the transparent glass substrates, wherein the nematic liquid crystal has a negative dielectric anisotropy and a longitudinal axis of a liquid crystal molecule of the nematic liquid crystal is oriented in a direction approximately perpendicular to the transparent glass substrates with no voltage applied; and
a pair of polarizing plates sandwiching the liquid crystal cell;
wherein
at least one of the pair of polarizing plates includes a protective film; a polarizer; and an optical compensation film,
one of the pair of transparent glass substrates, an adhesive; the optical compensation film; the polarizer; and the protective film are stacked in this order, and
the one of the pair of the transparent glass electrodes, the adhesive; and the optical compensation film satisfy the following equations (1) to (3):

$$|n1-n2| \leq 0.03 \qquad (1)$$

$$|n2-n3| \leq 0.03 \qquad (2)$$

$$|n1-n3| \leq 0.03 \qquad (3)$$

wherein n1, n2, and n3 indicate average refractive indices at 589 nm of the one of the pair of the transparent glass electrodes, the adhesive; and the optical compensation film, respectively.

2. The liquid crystal display device according to claim 1, wherein the one of the pair of the transparent glass substrates, the polarizer, and the protective film satisfy the following equations (4) to (6):

$$|n1-n4| \leq 0.03 \qquad (4)$$

$$|n4-n5| \leq 0.03 \qquad (5)$$

$$|n1-n5| \leq 0.03 \qquad (6)$$

wherein n4 and n5 indicate average refractive indices at 589 nm of the polarizer and the protective film, respectively.

3. The liquid crystal display device according to claim 1, wherein the optical compensation film satisfies the following equations (7) and (8):

$$30 \text{ nm} \leq Re(590) \leq 80 \text{ nm} \quad (7)$$

$$80 \text{ nm} \leq Rth(590) \leq 300 \text{ nm} \quad (8)$$

wherein Re(590) and Rth(590) indicate an in-plane retardation and a thickness-direction retardation of the optical compensation film, respectively, which are measured at a wavelength of 590 nm.

4. The liquid crystal display device according to claim 1, wherein an internal haze of the optical compensation film is 0.10% or less and a surface haze of the optical compensation film is 1.0% or less.

5. The liquid crystal display device according to claim 1, wherein an internal haze of the optical compensation film is 0.10% or less and a surface haze of the optical compensation film is 0.01% to 1.0%.

6. The liquid crystal display device according to claim 1, wherein the optical compensation film is subjected to a surface treatment and a surface haze of the optical compensation film after the surface treatment is 0.05% to 1.0%.

7. The liquid crystal display device according to claim 1, wherein the optical compensation film is a cyclic olefin film.

8. The liquid crystal display device according to claim 1, wherein the optical compensation film includes an additive having a negative intrinsic birefringence.

9. The liquid crystal display device according to claim 8, wherein the additive is polymethyl methacrylate polymer.

10. The liquid crystal display device according to claim 1, wherein an average refractive index n2 of the adhesive is 1.470 to 1.580.

11. The liquid crystal display device according to claim 1, wherein the adhesive is a copolymer including a repeating unit derived from an aromatic ring-containing monomer.

* * * * *